US011929549B1

(12) United States Patent
Polyakov et al.

(10) Patent No.: US 11,929,549 B1
(45) Date of Patent: Mar. 12, 2024

(54) DEPLOYABLE REFLECTOR

(71) Applicant: TRANSFORMABLE STRUCTURES.GEORGIA T.S. GEORGIA LLC, Tbilisi (GE)

(72) Inventors: Maxym Polyakov, Edinburgh (GB); Elguja Medzmariashvili, Tbilisi (GE)

(73) Assignee: PIPL LIMITED, Limassol (CY)

( * ) Notice: Subject to any disclaimer, the term of this patent is extended or adjusted under 35 U.S.C. 154(b) by 0 days.

(21) Appl. No.: 18/287,002

(22) PCT Filed: Apr. 14, 2022

(86) PCT No.: PCT/GE2022/050002
§ 371 (c)(1),
(2) Date: Oct. 14, 2023

(87) PCT Pub. No.: WO2022/219364
PCT Pub. Date: Oct. 20, 2022

(30) Foreign Application Priority Data

Apr. 14, 2021 (GE) ........................... AP 2021 15604

(51) Int. Cl.
*H01Q 15/16* (2006.01)
*H01Q 1/28* (2006.01)

(52) U.S. Cl.
CPC ........... *H01Q 1/288* (2013.01); *H01Q 15/161* (2013.01)

(58) Field of Classification Search
CPC ............................ H01Q 1/288; H01Q 15/161
See application file for complete search history.

(56) References Cited

U.S. PATENT DOCUMENTS 5,680,145 A * 10/1997 Thomson ............. H01Q 15/161 343/915
5,969,695 A * 10/1999 Bassily ................ H01Q 15/161 343/915
2015/0194733 A1 7/2015 Mobrem et al.

FOREIGN PATENT DOCUMENTS

GE P20053604 B 8/2005
GE P20186801 B 1/2018
WO 2013135298 A1 9/2013

* cited by examiner

*Primary Examiner* — Daniel Munoz
(74) *Attorney, Agent, or Firm* — Georgiy L. Khayet

(57) ABSTRACT

Provided is a deployable reflector that includes a reflector, a tensioning frame with a deploying ring including upper booms and lower booms, sections composed of lower rods and upper rods and including pantograph levers, stanchions mounted between the upper booms and the lower booms, scissors-like levers located at an intersection of the pantograph levers, first sleeves put on the pantograph levers, second sleeves disposed on the lower rods and the upper rods, cylindrical joints disposed on the second sleeves, an expansion ring for connecting the upper rods and the lower rods, a reflector fixing mesh having triangular cells composed of elastic rods, an upper concave mesh and a lower convex mesh fastened with peripheral units and composed of triangular shape cells, where the reflector is attached to the upper concave mesh directly or is fastened to the upper concave mesh with a spatial shape gasket.

20 Claims, 34 Drawing Sheets

DEPLOYABLE REFLECTOR

This application is a 371 national phase entry of international PCT application No. PCT/GE2022/050002, entitled "DEPLOYABLE REFLECTOR," filed on Apr. 14, 2022, which claims priority to Georgian application No. AP 2021 15604, entitled "DEPLOYABLE REFLECTOR," filed on Apr. 14, 2021. The aforementioned applications are incorporated herein by reference in their entirety for all purposes.

The invention relates to radio engineering field, specifically deployable space reflectors, and it can be used for large size space antennas.

A mechanical support frame of a space reflector is known (see patent GE 6801, class H01Q 15/16, Oct. 1, 2018) that comprises a mechanical support ring of the space reflector; rings composed of V-shaped foldable rods placed in parallel at the reflector working and rear sides; stanchions between these rods; brackets that hingedly connect the ends of the rods to each other and to the stanchions in V-shape manner; a deploying mechanism composed of cables for winding on drums and drums attached to connecting brackets fastened on two stanchions disposed diametrically opposite to rollers mounted by projections on connecting brackets and rods in intermediate points of breaking rods foldable in V-shape manner, that are attached to the drums at one end, led on the intermediate rods of breaking of the V-shaped foldable rods and on rollers mounted on projections of the brackets, and with the other end is attached to the projections of the brackets by means of tensioning springs; besides, helical twisting springs are mounted on the intermediate axes of breaking the V-shaped foldable rods placed in parallel at the working and rear sides, with arms fastened from the inside of these rods; the brackets that hingedly connect of the ends of the V-foldable rods to each other and to the stanchions are made with the arms joined at angles to each other and have H-shape diagonal grooves made from the side of the stanchions, and symmetrical grooves are made in the walls next to the H-shape diagonal grooves and transverse cylindrical axes are inserted; besides, fixtures are mounted on the stanchions to turn the stanchions about the transverse cylindrical axes, and flexible vibration compensators are installed between the brackets of the V-foldable rods of the support ring and the stanchion ends, that are made in the form of cylindrical springs of twisting, which are attached to the brackets at one end, and at the ends of the stanchions at other ends.

The disadvantage of the space reflector is that the deployable ring has low deployment reliability due to the oscillation of the rods when stretching the flexible stretching straps designed for connecting the foldable rods that are hingedly interconnected, and also it is impossible to maintain the accuracy of the geometric shape of the deploying ring.

A deployable space reflector is known (see patent GE 3604, class H 01 Q 15/20, 25, Aug. 2005), comprising a tensioning frame with developable elements forming an approximate surface of the reflector, with an elastic reflector attached thereto; tensioning frame of the deploying ring consisting of hingedly interconnected rods and connected to the peripheral ends of the reflector tensioning frame, and the deploying ring is provided with an opening mechanism with a drive; besides, at the peripheral ends of the developable elements of the reflector tensioning frame, diagonal rods are attached parallel to each other or inclined with the end bended towards the periphery from the elastic reflector fastening side, and on these diagonal rods, a deployable dome frame is connected by fixed or movable connections from the outside of the tensioning frame, with the elastic reflector mounted thereon such that is capable of merging with the reflector tensioning frame to assume the reflector with symmetrical, asymmetrical, or offset, circular in plan, oval, or polygonal configuration; the stems of the deploying ring are of equal length and are hingedly connected in pairs with each other, and the junction of these rods is located in the middle of the length of the rods or offset from the middle, with the ends of the rods of adjacent pairs of rings being connected to each other hingedly, and to the diagonal rods of the reflector tensioning frame—fixedly or with the capability of sliding, the flexible reflector is made of a whole tensionable elastic mesh, membrane, or of the later composed of individual parts, and the developable elements of the reflector tensioning frame are elastic sheets or flat ribs made of membranes; and the diagonal rods attached to their ends are rigid rods of equal or different lengths; besides, the flat ribs of the reflector tensioning frame are connected to each other with radial, radial-ring, parallel, triangular, rectangular or hexagonal pattern in a plan, and intermediate ribs of rigidity are mounted on the flat ribs of the reflector tensioning frame or on the line of intersection of these ribs; and the connections of the reflector frame and the support frame are stanchions and/or braces; besides, the ends of the braces are connected to the ends of the stanchions and/or each other, while the end stanchion or the end brace is connected to the diagonal rod; besides, the elements of the reflector frame, the elements of the support frame and their connections are located in one or different planes and form a radial, radial-ring or radial-lattice parallel, rectangular, triangular or hexagonal structure in the plan, or a composite structure composed of these structures; and the connections of the ends of the rigid rods adjacent to the deploying ring to the rod of the immovably attached surface forming tensioning frame are cylindrical joints; being movably connected to cardan joints comprising cylindrical joints, and cylindrical units of diagonally arranged vertices of joint rectangles are attached to whole or telescopic rods; besides, the deploying ring is provided with a fixing mechanism, which is a ratchet mechanism, and is arranged on single or telescopic rods attached to a cylindrical unit; and limiters are placed between the ends of the pairs of connecting rods of the deploying ring connected to the diagonal rods with the capability of moving, to limit the movement of these ends; besides, springs for damping the ends of the rods are put on them; and the opening mechanism with a drive of the deploying ring drive is a load-bearing cable, with one end with a spring compensator attached to the end of one of the rods of the deployable ring that are hingedly connected to each other, led along this rod on bearings mounted diagonally on the ends of the rods, and the other end is attached to the drum attached to the deploying ring to wind the load-bearing cable that is connected to the drive.

The disadvantage of the known space reflector antenna is that the deployable ring has low deployment reliability due to the oscillation of the rods when stretching the flexible stretching straps designed for connecting the folding rods that are hingedly interconnected, and also it is impossible to maintain the accuracy of the geometric shape of the deploying ring.

A light weight reflector antenna is known for concentrating radiation (see U.S. Pat. No. 5,680,145, Class H 01 Q 15/20, 21.10.1977), comprising a deploying ring composed of flexible rods with a reflector attached to it; the deploying ring has a truss having a stanchion-diagonal, in the upper and lower boom joints of which a flexible heavy pre-stensioned center is attached, to which a reflector is attached, and the tensioned center consists of flexible straps, the upper concave and lower convex meshes formed by intersecting, which with their peripheral units are attached to the units of the upper boom and the lower boom of the deploying ring; the meshed have a triangular cell shape, the sides of the triangle are flexible rods, and their intersection forms units that coincide with the vertices of the triangle, the upper concave mesh has a reflector on the bottom, and the concave mesh, which is placed on the top of the reflector with its units, is also connected by flexible stanchions to the corresponding units of the lower, convex mesh, but it happens so that the flexible stanchion, which extends from the upper mesh unit to the lower mesh unit, is passed through the reflector. In addition, the flexible stanchion is provided with tensioning springs. The construction of the central part in this form is associated with many positive factors, including: the upper and lower meshes, with their stretching, which always exceeds the compressive force generated in the mesh rods by various factors, is a geometrically invariant system; as for the tensile forces in the meshes, they are generated by stretching the ridges of the flexible stanchions, which is carried out by the booms placed on it. The structure of such a stretched and geometrically unchanged center also ensures that the ring achieves the shape of an oval and maintains it.

The disadvantage of the known reflector is the low reliability of the structure and its complexity. Although it has a stable form it is well suited to the calculations. Based on these theoretical calculations and diagrams, a geometric shape is precisely achieved. In real conditions, after the inaccuracy of the design of the technological assumptions and the selection of the center elements only by theoretical calculations, deviations from the design location of the reflector fastening units still occur. In such a case, the structure of the center does not allow the adjustment of inaccuracies found after its manufacture.

Also, it is known a reflective antenna system of a deployable reflector (see U.S. Ser. No. 10/516,216, class H 01Q15/16, H 01Q7/02, 18, Jul. 2019), that comprises a tensioning ring composed of pantographs with its structure, by which the upper and lower units of the pantograph are connected to the upper and lower peripheral units of the flexible central part of the reflector antenna; a reflector antenna reflector is attached to the surface of the central part, the deploying ring composed of a pantograph has upper and lower boom sections consisting of flexible rods; which together with the pantograph form a pre-tensioned cable-rod system, the tensioning forces of the flexible upper and lower booms are selected in such a way that they always exceed the compressive forces that are also generated in them by the reflector center tensioning. In order for the system to maintain geometric invariability, i.e. the upper and lower booms to be constantly stretched, therefore it is necessary that the tensioning forces generated by the pantographs exceed the compressive forces generated by the tensioning of the center of the reflector antenna in the booms; at the same time, the deploying ring is deployed and, as a result, the upper and lower booms are stretched by pulling the load-bearing cable passed through unilaterally inclined pantographs by an electric drive in the direction of each other, and in the last stage of the deployment of the deploying ring with the load-bearing cable, the movement of the upper and lower units towards each other is restricted; with a tube attached to one unit, in which the cable is passed, it is abuted and folded at the second unit. From this point on, the structure of the deploying ring changes and is supplemented by stanchions made of rigid rods.

The disadvantage of the known reflector is the low reliability and complexity of the construction, which is caused by the over tension of the levers under the influence of the tensioning cable passed in the unilaterally located levers of the pantograph of the deploying ring. Such a picture of the position of the load-bearing cable causes asymmetric tensioning of the ring. Performing flexible joints of the upper and lower booms with one-sided joints, on the one hand, requires them to be stretched so that the tensile force exceeds the compressive force directed towards the center, and on the other hand—to maintain the value of this stretch during the whole operation, which is specifically difficult to achieve, at the last stage of deployment of the ring, a change in the specific structure of the ring, which is manifested by the formation of stanchions therein, leads to an increase in the weight of the construction and the existence of a complex scheme of locking mechanisms, in addition to the above, the use of flexible rods in the booms adversely alters the mechanics of the deploying ring, especially maintaining its stability in the process of oscillations.

The technical result of the invention is improving the reliability of the reflector structure by maintaining the accuracy of the geometric shape of the deploying ring and increasing the synchronicity and maintaining the geometric shape of the reflector, as well as reducing the structure weight and simplifying the structure.

The essence of the invention is that the deployable reflector comprises an elastic reflector 53 composed of elastic rods, a reflector tensioning frame 1, a reflector tensioning frame 1 with a deploying ring 2 comprising an upper 28 and lower 29 booms composed of hingedly interconnected lower 14 and upper 15 rods; and connected to the peripheral ends of the reflector tensioning frame 1; the adjacent lower 14 and upper 15 rods of the upper and lower booms are connected to each other by space-oriented units 11 comprising foldable rods connecting consoles 76 to which key sheets 75 are attached, and are connected to the reflector 53 unit 52, the deploying ring 2 is provided with an opening mechanism with a drive 33, which is a load-bearing cable 27, one end of which is fixed to a roller 30 existing at the ends of the foldable rods 14, 15 of the upper 28 and also the lower 29 booms, and the other end is mounted on an electric drive 33 and is capable of winding on a drum 35 mounted on the drive axis; sections 3 are composed of hingedly interconnected elastic foldable rods 14, 15 of the deploying ring, each of the sections also comprising crosswise intersecting pantographic levers 5 interconnected by a cylindrical joint 6 (4), upper concave 40 and a lower convex meshes 41 that are fastened with their peripheral units in the units 38, 39 of attachment of the meshes to the upper 28 boom and, respectively, to the lower 29 boom of the deploying ring 2; flexible stanchions 46, 47 mounted between the upper 28 and lower 29 booms that are elastic rods; besides, the scissors-like levers 7 are located on the central unit 6 at the intersection of the crosswise intersecting pantograph levers 5, with sleeves 8 put on the ends of the pantograph levers 5 from another side; also on the ends of the upper and lower boom rods 14.15, sleeves 16 for putting on are disposed, on which cylindrical joints 17 are disposed; besides, the expansion ring 2 comprises the upper and lower foldable rods connecting means made in the form of an elastic rod 62 that is attached by one end to the axis 61 of the intermediate connecting cylindrical joint 20 of the foldable rods 14, 15, and by the other end is fastened on a reel 65 disposed on the rotary axis 64 of the cylindrical joints 4 that connect the intersecting pantographic levers 5, and is capable of winding thereon, or in the form of a tube 70 the reel has on its wings cutouts 67 for fixing the plates 22 that connect the foldable rods in the folded state, and, also, between the spatially oriented units 11 which connect the hingedly interconnected adjacent upper and lower boom rods 14.15, there is provided a distance adjusting telescopic limiters (100) which are attached to the spatially oriented units 11; in addition, it also comprises a reflector fixing mesh 55 with triangular cells composed of elastic rods 54 that is fastened in the units 52 of connection of the reflecting mesh 53 rods, and with 56 units with springs 56 at its end, together with the reflector 53, is fastened in the units 38 of attachment of meshes to the upper boom, that are attached to the projection 36 of the spatially oriented units 11 of the upper boom, on the shelf 58 located above the units; besides, the upper concave and lower convex meshes 40, 41 are composed of triangular shape cells by the units of connection of the sides of which the upper concave and lower convex meshes 40,41 are connected to the reflective mesh 53; and on the elastic rods 54 of the reflector fixing mesh 55, when they are positioned at different levels, additional elastic rods 88 are arranged on the reflector attachment side on the elastic rods 54 to equalize their levels; besides, the stanchions consisting of flexible upper 46 and lower 47 portions mounted between the upper concave mesh and the lower convex mesh are provided with tensioning springs 50 and with spring-length regulating devices mounted inside the springs, that is made in the form of a telescopic limiter 89; besides, the reflective mesh is attached to the intersection units 43 of the elastic rods of the upper concave mesh 40 directly, or in the upper concave mesh units 43 the lower ends are fastened with a spatial shape gasket 51, the upper ends of which are attached to the tensioned reflector 53 units 52 and to the reflector fixing mesh disposed above or under it; besides, the spatial shape gasket 51 is capable of changing the length between its lower and upper parts.

The scissor-like levers 7 located at the central unit at the intersection of the pantographic levers 5 with the sleeves put on them are designed to be disposed in the plane of the section 3 of the pantographic levers 5 and symmetrically with respect to the longitudinal symmetry axes.

The load-bearing cables 27 are led separately onto rollers fastened on axes of cylindrical joints of the upper and lower booms oriented units 11 and their one ends are fixed on a roller along the upper and lower booms, while the other ends are fixed in the electric drives.

The electric drives of the deploying mechanism 33 are fastened to one of the rollers of the upper, as well as of the lower boom, and the load-bearing cable winding drums 35 are fastened to the axis of the electric drives.

One end of the flexible stanchions 92 that connect the upper concave mesh and the lower convex mesh is fastened in the units 43 of intersection of the triangular cells that constitute the upper convex mesh 43, and the other end is passed through a hole 93 made in the intersection unit 41 of the elastic rods of the lower convex mesh 41 and is attached to the unit of intersection of the flexible rods 44 of the lower convex mesh at the 96 end of the length-adjusting screw device 96 located inside the tensioning spring 94 abutted from outside; at the same time, to the hole 93 made in the intersection units 45 adjacently attached is a latch 98, 99 for limiting the motion of the flexible stand 92 tensioning spring 94.

Flexible stanchions connecting the upper concave mesh and the lower convex mesh are made in two parts 46, 47 and the tensioning springs 50 and the telescopic limiters adjusting the spring length 89 are fixed between them, one end of the stanchions 46, 47 is attached to the intersecting units 43 of constituent triangular cells of the upper concave mesh 40, and the other end is attached to the intersecting units of the constituent triangular cells of the lower concave mesh 41.

Additional flexible rods 88 stacked on the side of the reflector attachment to the elastic rods of the reflector fixing mesh 55 are located between the elastic mesh units and adjacent units.

To change the length between the lower and upper parts of the spatial gasket 51, additional gaskets 83 are placed to change the length of the spatial gaskets by changing their number.

The spatial shaped gasket 51 for changing the length between its lower and upper parts, screw holes 85 are arranged in its lower and upper parts, between which an axis 87 with thread of different directions is placed.

Flexible stanchions 92 for connecting the upper and lower meshes, which are passed through the hole 93 made at the intersection unit of the elastic rods of the lower convex mesh, are provided with latches 97, 98, 99 adjacent to holes, at both sides, for limiting the motion of the spring.

The telescopic limiter 100 attached to adjust the distance between the oriented units 11 of the upper and lower booms has an threaded adjusting rod 103 located on the inner tube 102 to adjust the length of the telescopic limiter and fix the reflector antenna in the designed state at the end of the process deployment.

A tube 70 that is disposed between the intermediate units 20 of the foldable rods and the central unit 6 of every section 3 of the deploying ring is fastened by means of a fastening means 68 disposed on the rotary axis 64 of the central unit 6 of every section 3 of the deploying ring, other ends of the tubes 70 at both sides reach the intermediate units 19 that connect the foldable rods of the foldable lower and upper booms of the tensioning frame of the deployable reflector antenna; caps 71 with locking means 72 are fastened on the ends of the tubes 70 for limiting the sliding by influence of the load-bearing cable led on the roller disposed at the end of the plates that connect the foldable upper and lower rods of the bearer disposed on the shaft of the cylindrical joint that connects the foldable upper and lower rods when the upper and lower booms are fully opened.

The gear-type synchronizers 13 are fixedly attached at the ends of the foldable upper and lower rods 14, 15, the teeth 72-2 of which abut to one another in the spatially oriented units 11 that connect the rods and are hingedly fastened in the sheet of the units 75 by rods, which has a console-like projection 76 directed towards the central units of the crosswise intersection of the pantograph levers, at the end of which rollers 77 for passing the load-bearing 27 are disposed, the unit 73 is provided with a bearer 78 that is capable of sliding on the tube 70, which is rigidly 80 fastened on the shaft of the central cylindrical unit with its medium point, and has caps 81 from the inside of the deploying ring and at the ends, with the bearer retaining mechanism 82 to retain the bearer in the fully opened state of the foldable upper and lower rods.

Two pairs of rollers 104 are fastened at both sides of the other ends of the tubes 70 that are fastened by units at the side of the upper and lower booms on the fastening means 68 disposed on the rotary shaft of the central unit 6 of every section 3 of the deploying ring 2, and the deploying load-bearing cable 27 is led on the rollers, other ends of the tubes 70 at both sides reach the axis of the roller 105 disposed above the cylindrical unit that connect the foldable lower and foldable upper rods of the tensioning frame of the deployable reflector, wherein the caps 71 with locking means 72 are fastened at the ends of tubes 70 to retain the bearer 71-1 disposed on the shaft of the cylindrical joint that connects the foldable upper and foldable lower rods when the upper and lower booms are fully opened, which is capable of moving by the influence of the deploying load-bearing cable 27 led on the roller 104 disposed at the end of the tube, passing the roller disposed on the cylindrical joint that connects the foldable upper and lower rods, than returning to the roller 105 disposed on the cylindrical joint and led on the neighbouring section.

The description of the invention is explained in the drawings, wherein.

Figure 26:
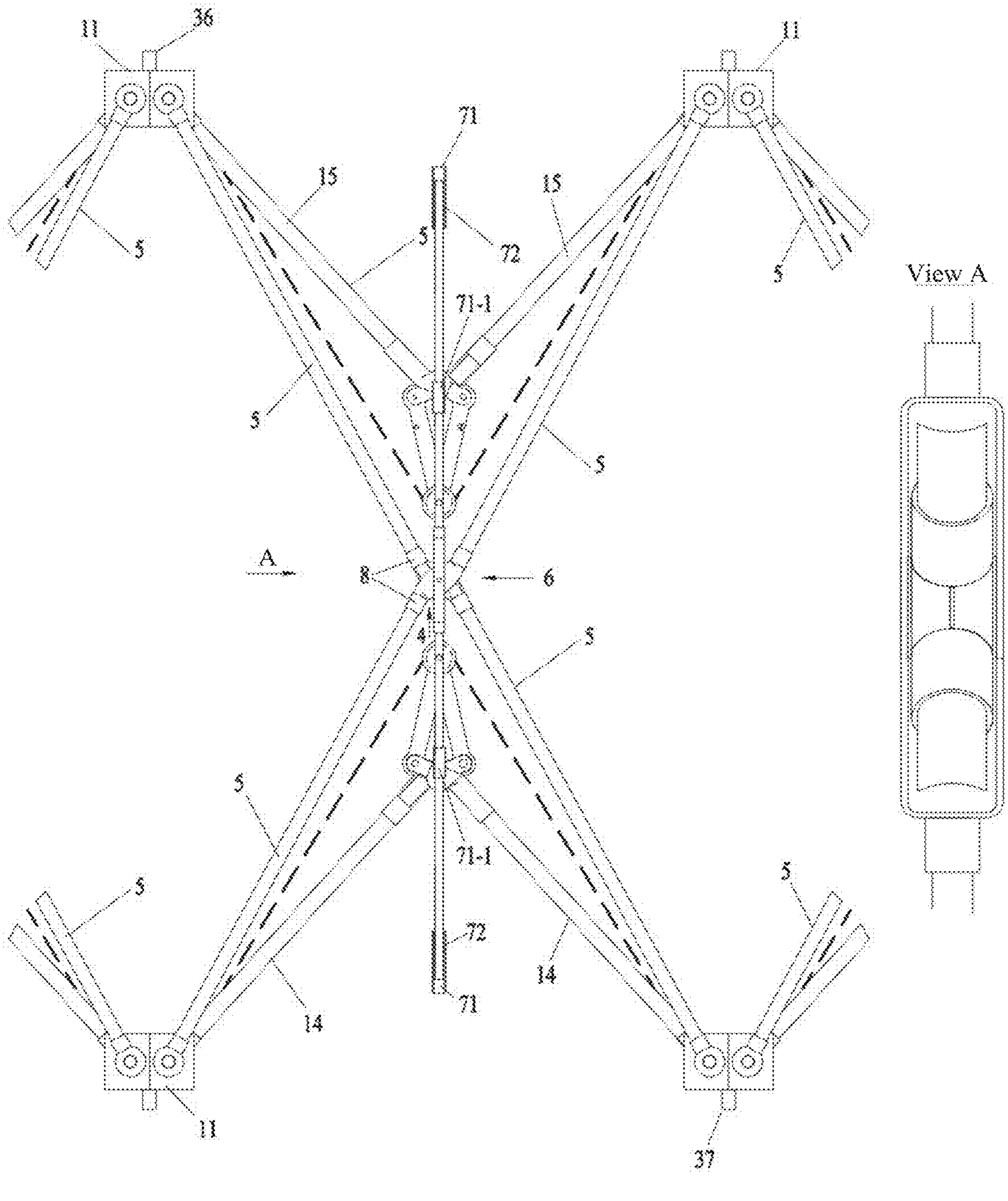
Figure 27:
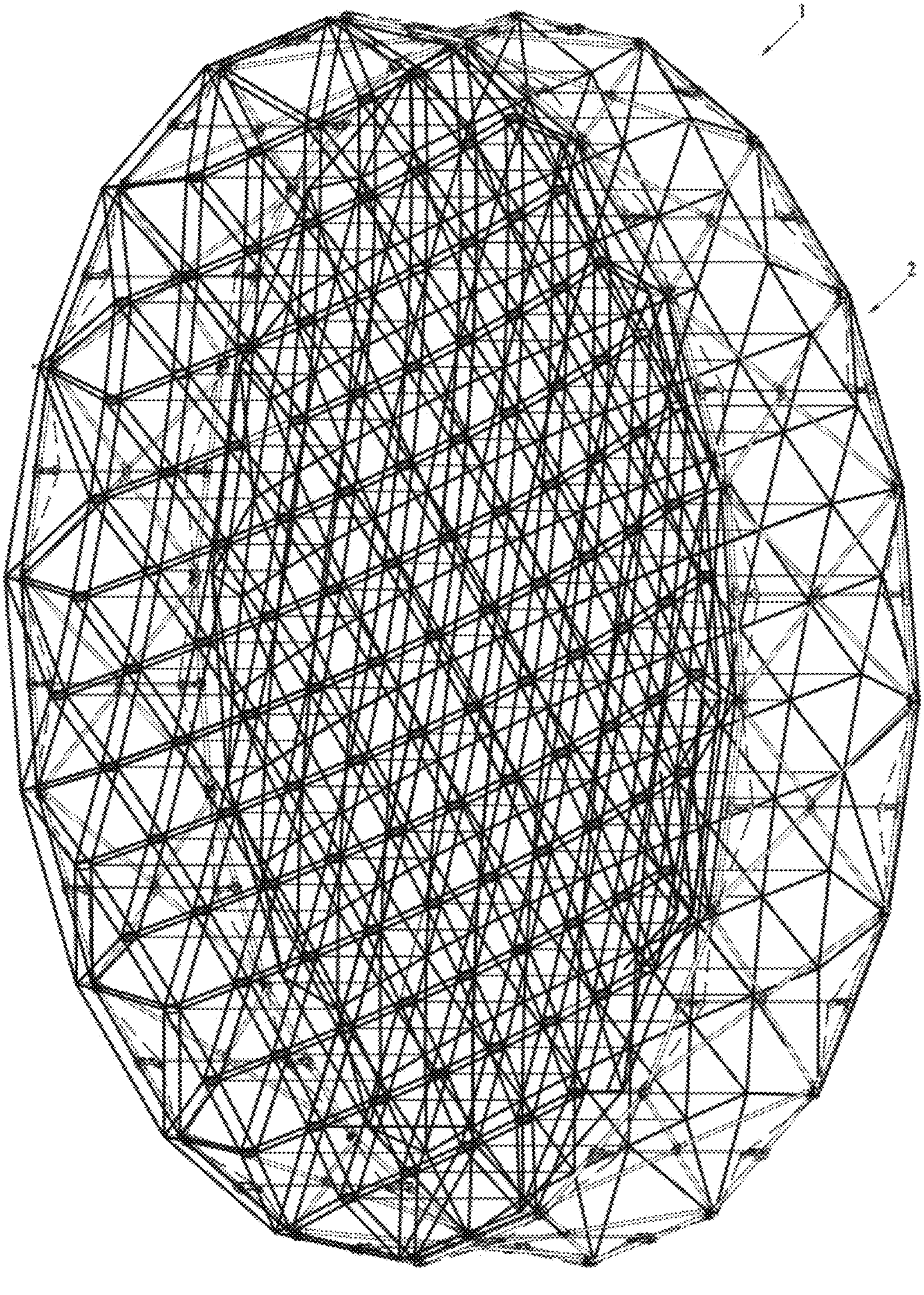
Figure 28:
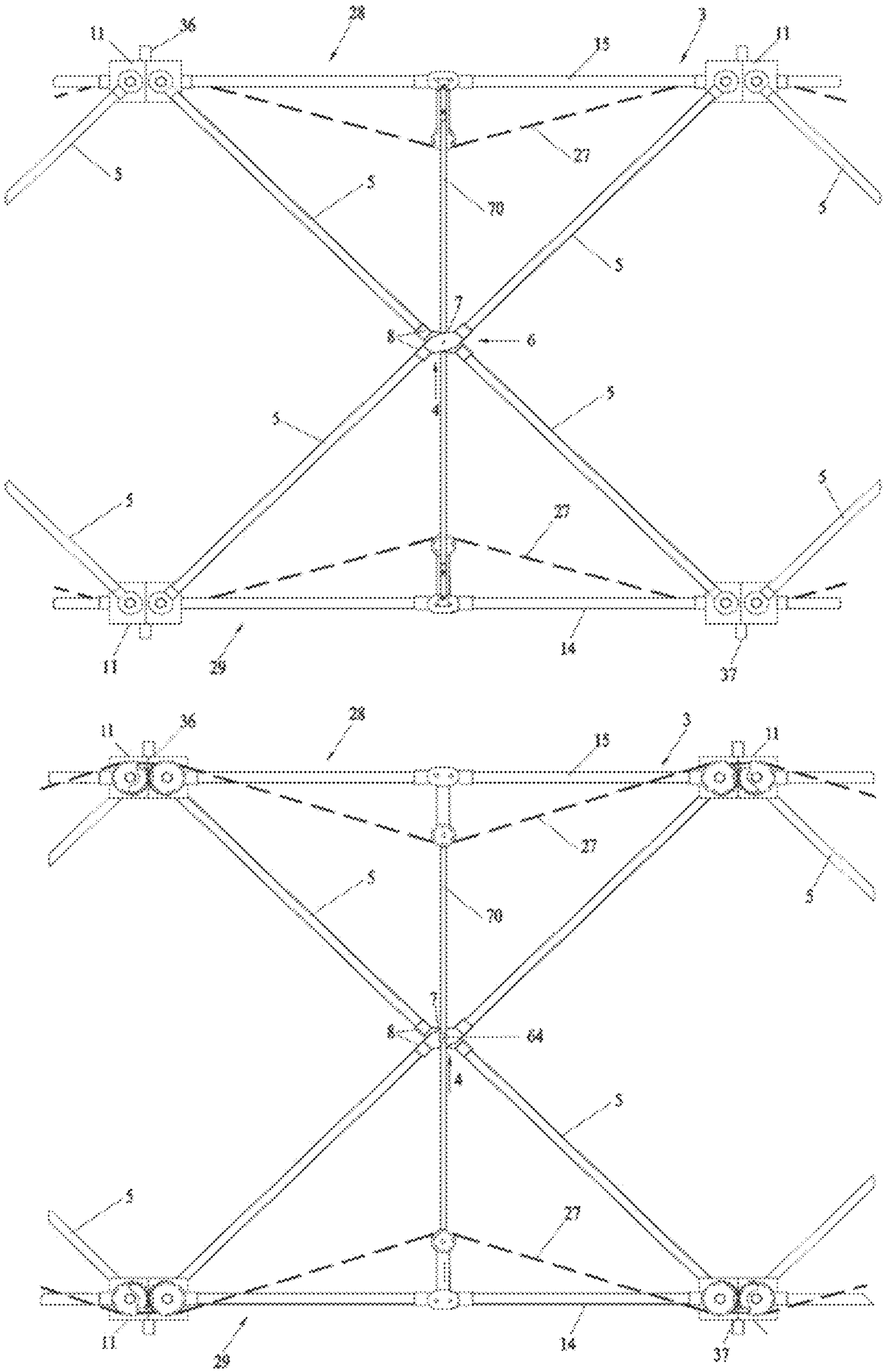
Figure 29:
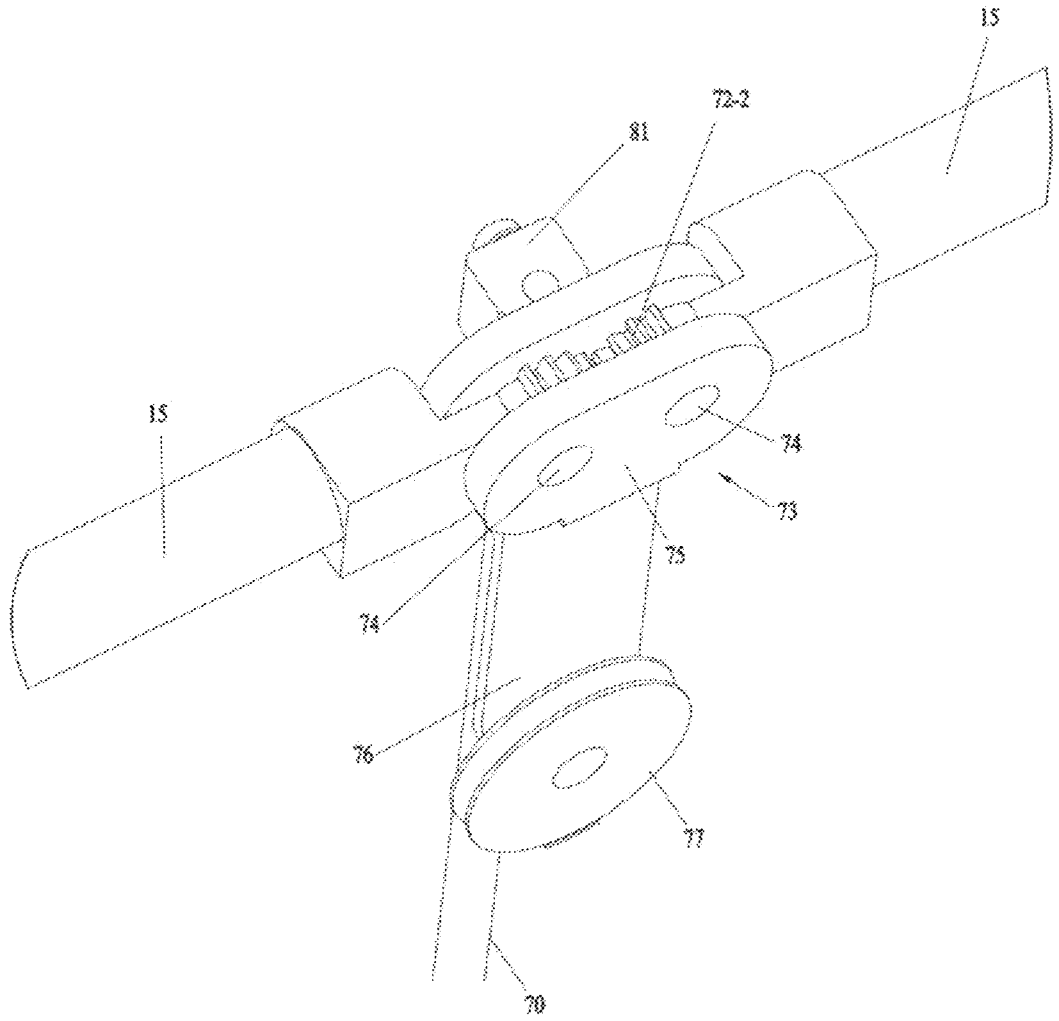
Figure 30:
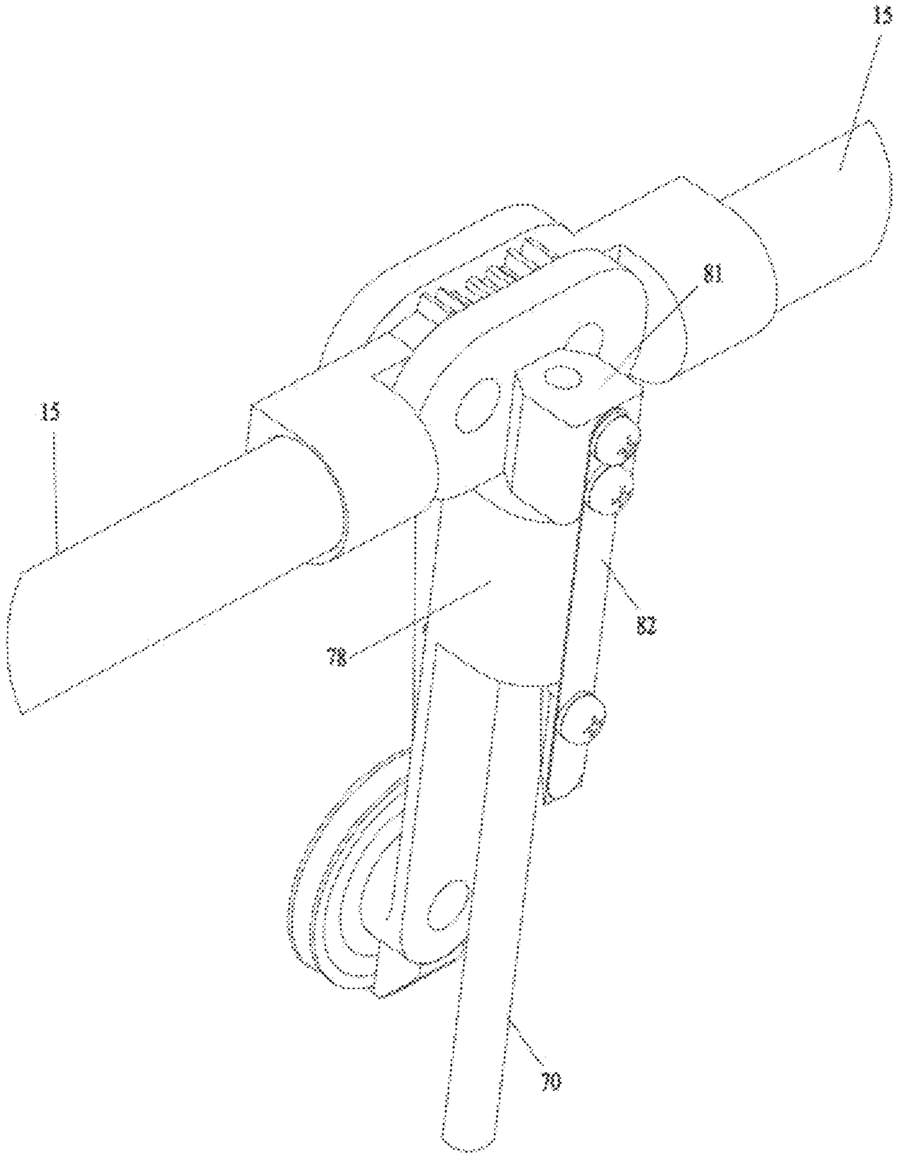
Figure 31:
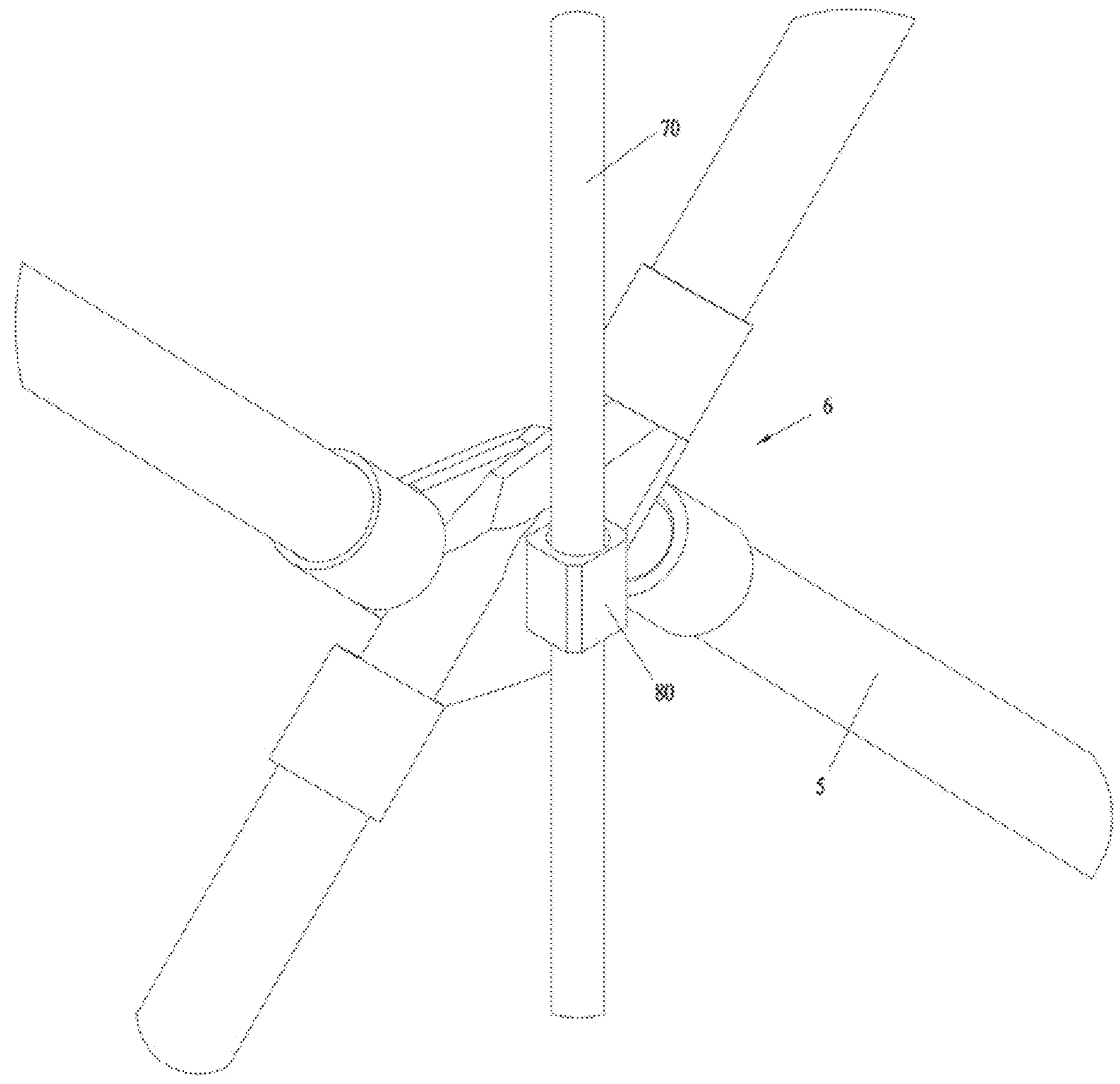
Figure 32:
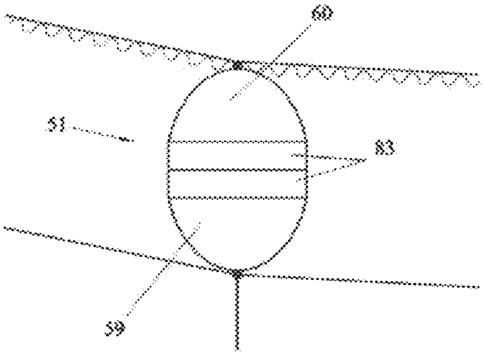
Figure 33:
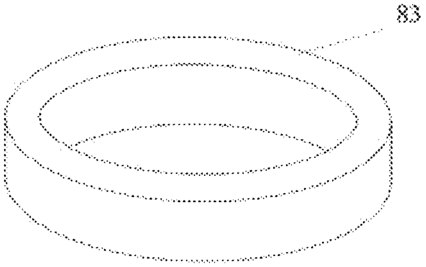
Figure 34:
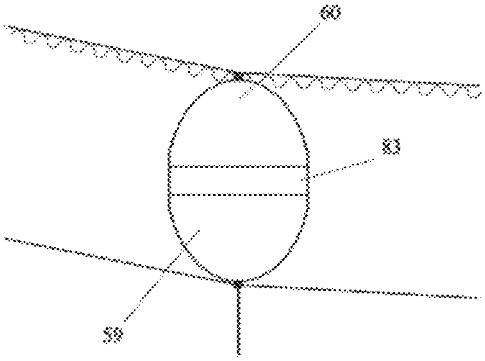
Figure 35:
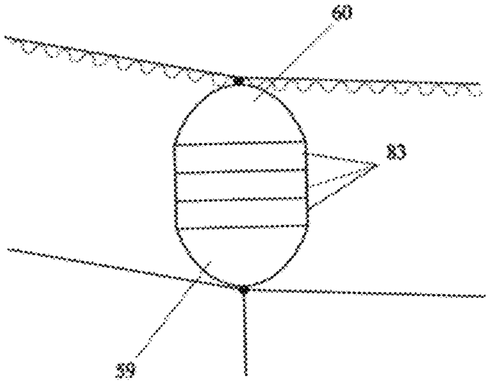
Figure 36:
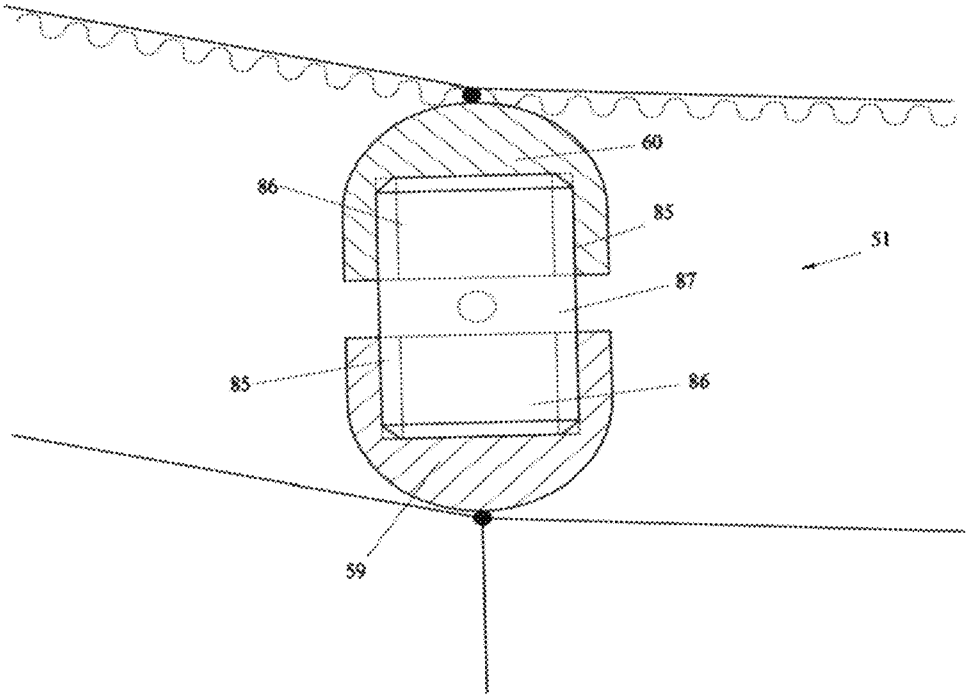
Figure 37:
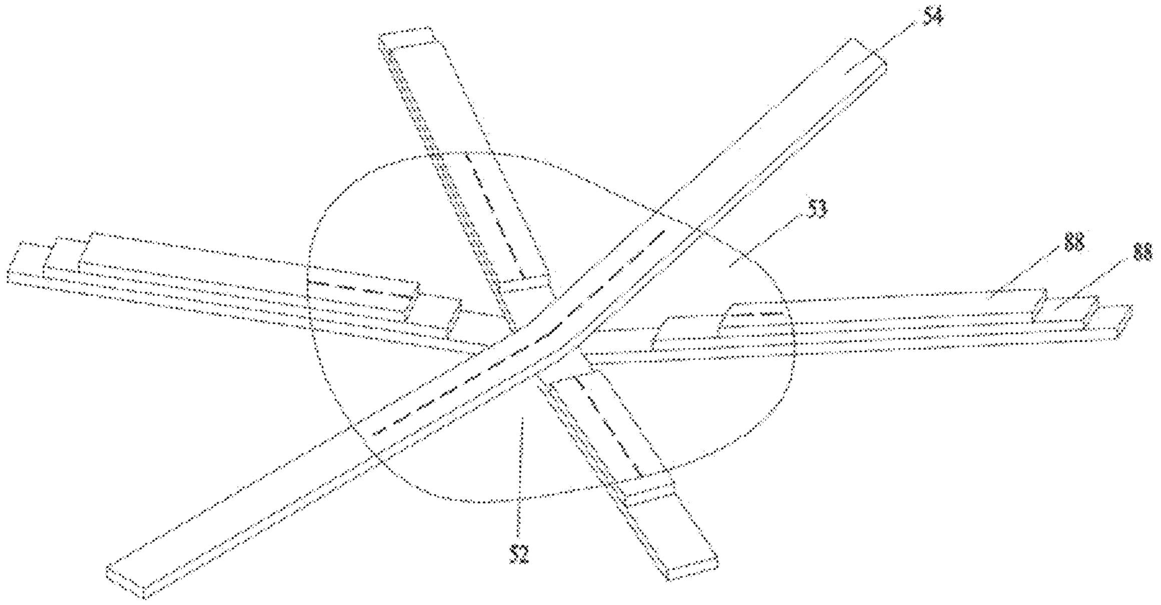
Figure 38:
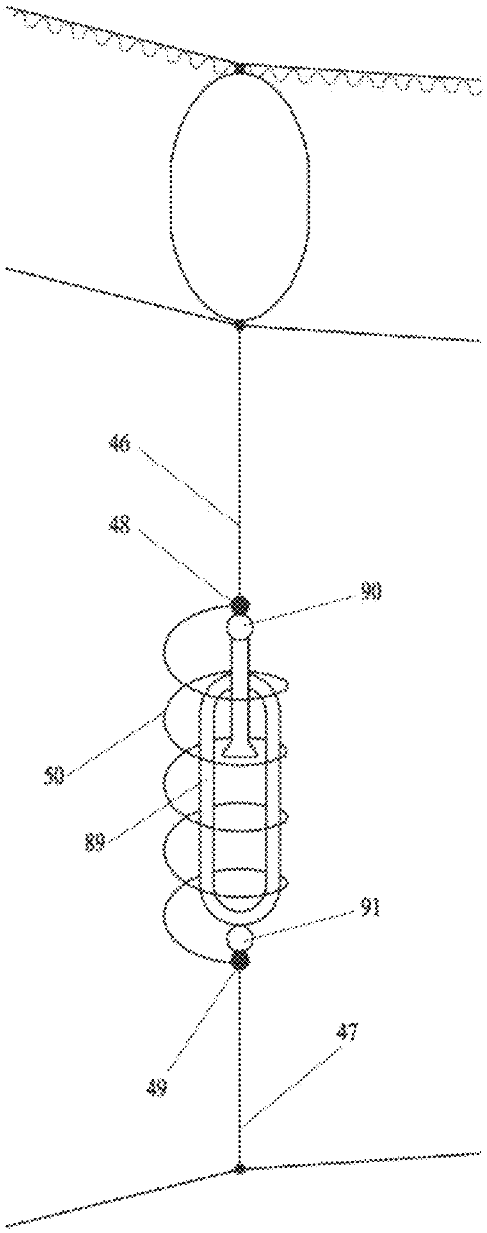
Figure 39:
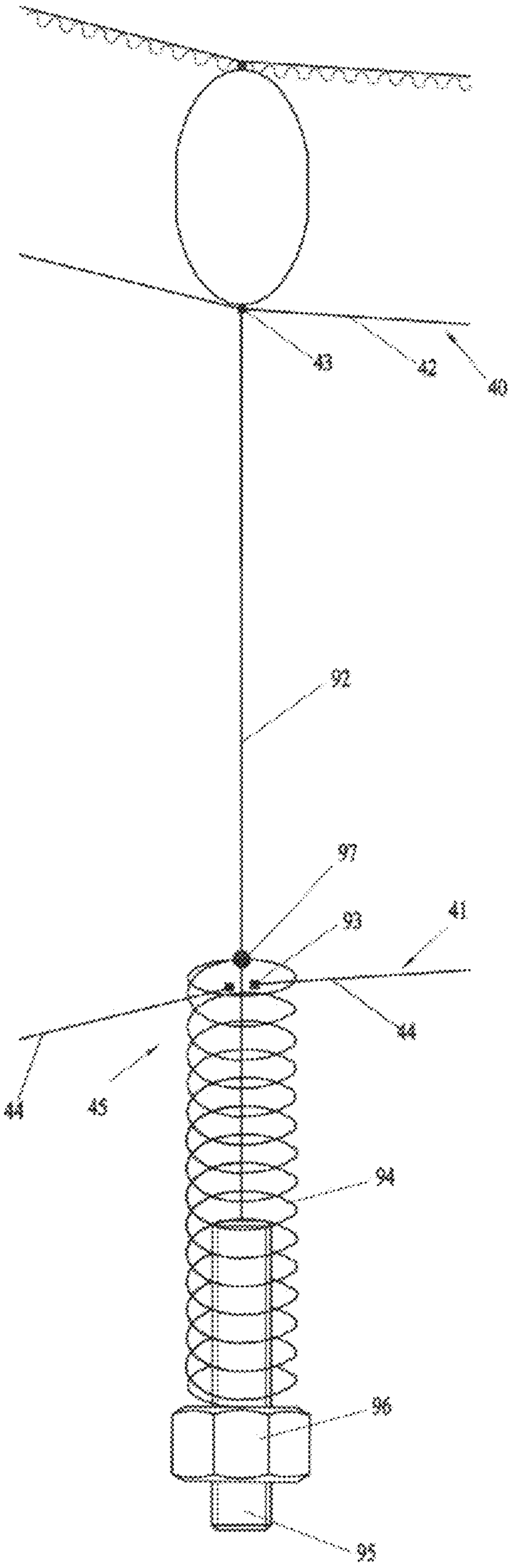
Figure 40:
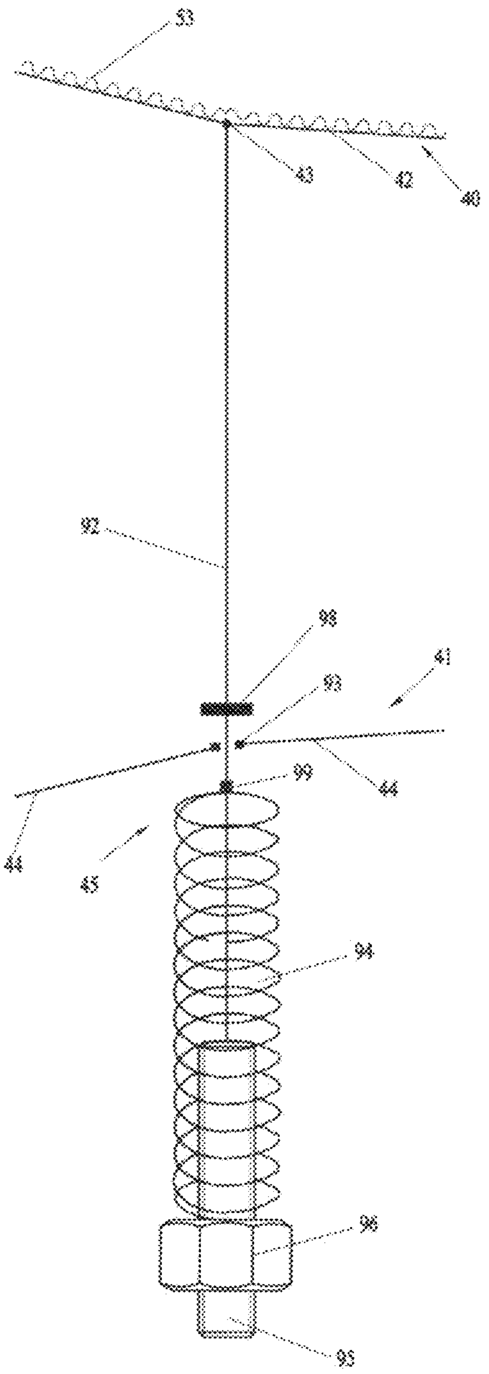
Figure 41:
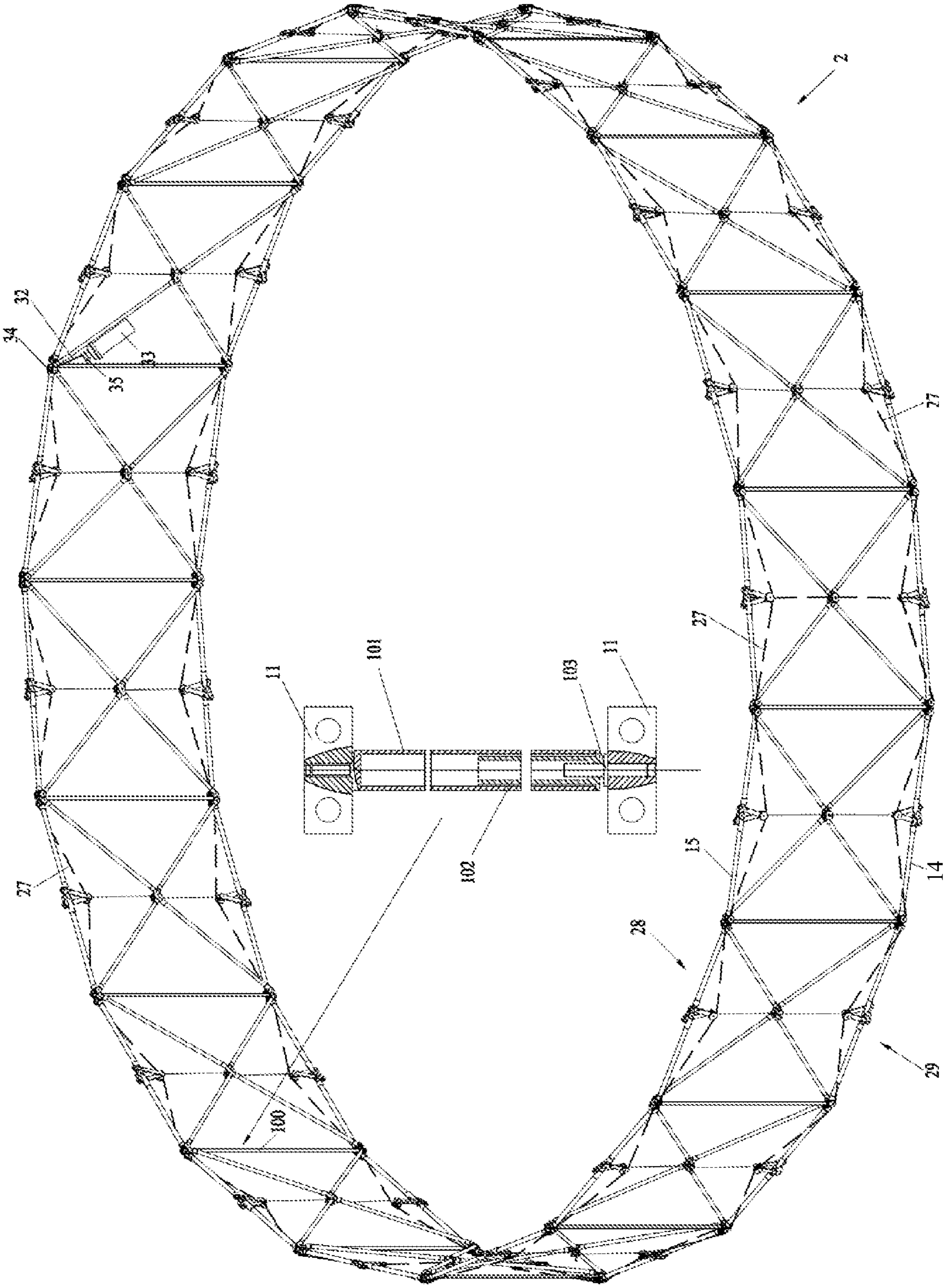
Figure 42:
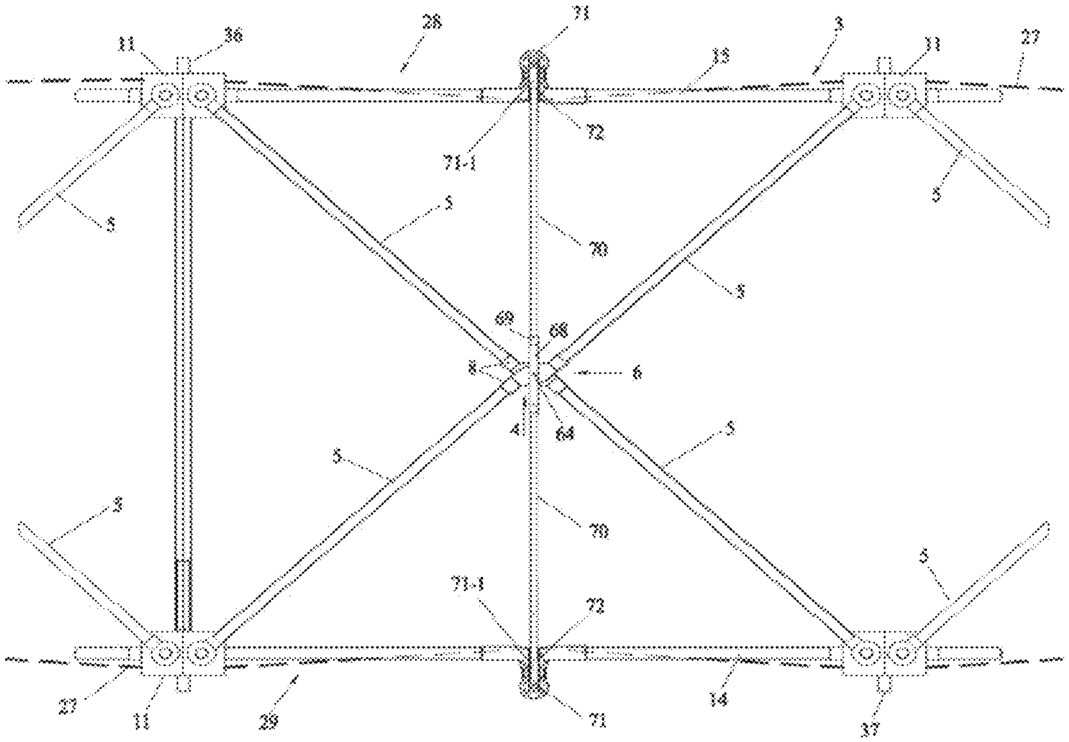
Figure 43:
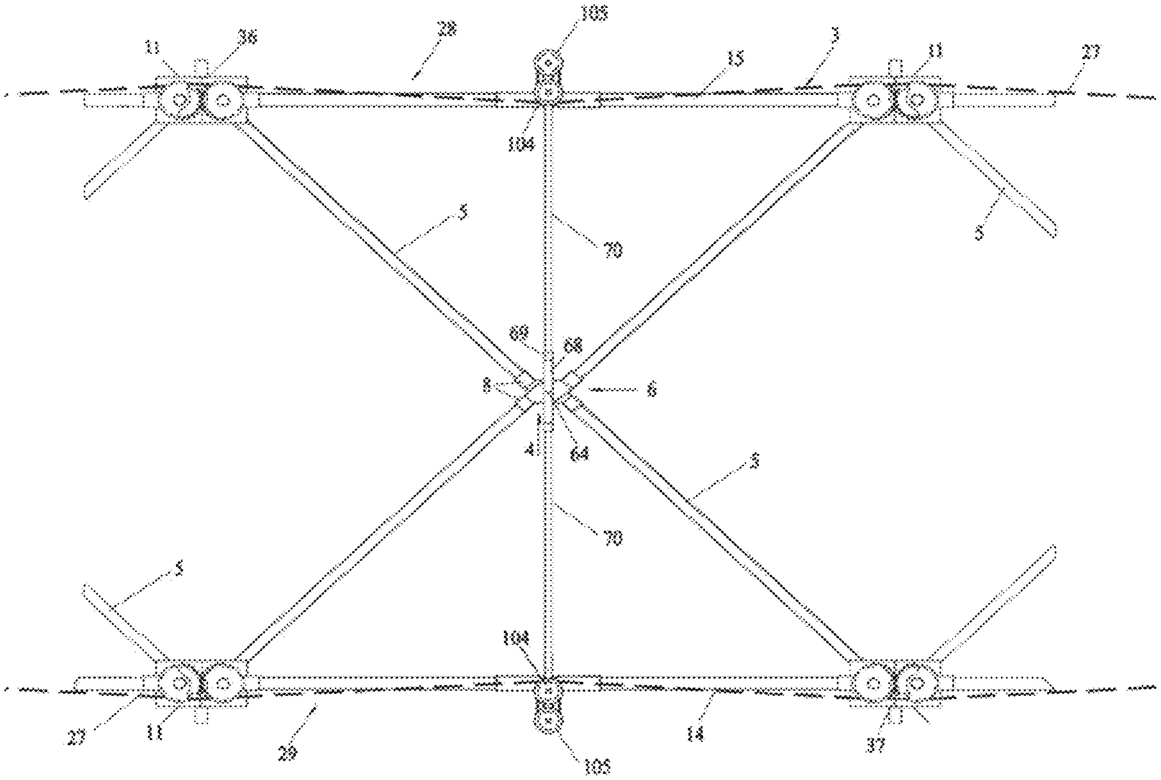
Figure 44:
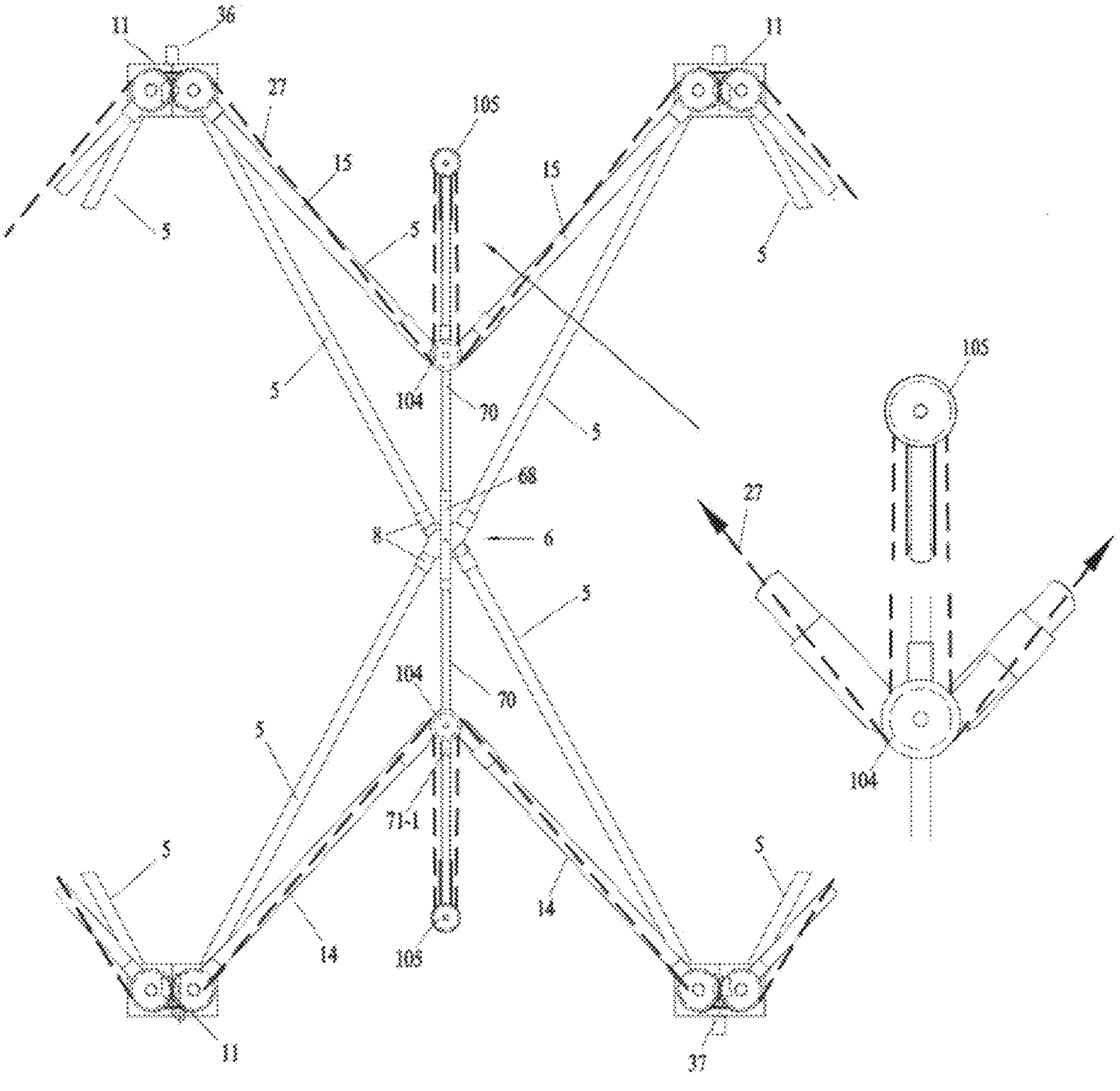
Figure 45:
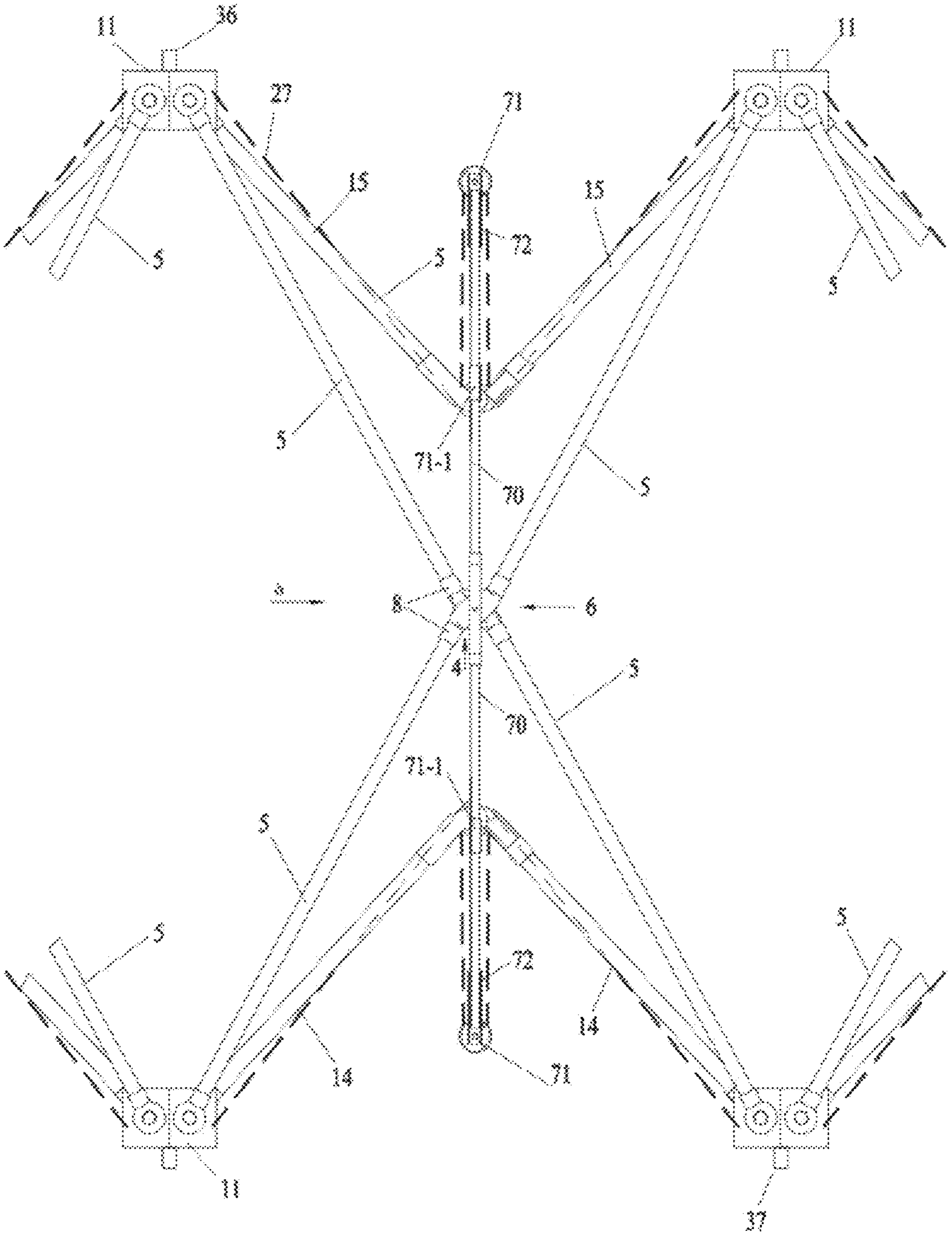

in a semi-folded state, external view;

FIG. 26 shows an individual section of the deploying ring (embodiment II);

in a semi-folded state, internal view;

FIG. 27 shows a deployable reflector (embodiment III) with a rod inserted in the center of the crosswise intersecting pantograph levers of the deploying ring;

FIG. 28 shows the internal and external views of an individual section of the deploying ring (embodiment III);

FIG. 29 shows a unit of the foldable rods, with synchronization gears fixedly disposed at the ends of the foldable rods, external view;

FIG. 30 shows a unit of foldable rods with a bearer, at the end of which caps with a retainer mechanism are disposed;

FIG. 31 shows a central cylindrical unit;

FIG. 32 shows a spatial shape gasket;

FIG. 33 shows an additional gasket;

FIG. 34 shows the reduction of the length of the spatial gasket by the removal of the additional gasket;

FIG. 35 shows the increase in the length of the spatial gasket by inserting the additional gasket;

FIG. 36 shows the spatial gasket with a shaft with screws of different directions, the rotation of which changes the length of the gasket;

FIG. 37 shows the flexible rods of the reflector fixing mesh located at different levels, with additional flexible rods arranged on the flexible rods to equalize the levels;

FIG. 38 shows a tensioning spring with a telescopic limiter placed between the upper and lower parts of a flexible stanchion attached between the units of the upper concave mesh and the lower convex mesh of the reflector;

FIG. 39 shows a continuous tensioning flexible stanchion, one end of which is fastened to the upper concave mesh unit, and the other end is attached to the edge unit of the tensioning spring, where a tensioning spring length adjusting screw device is arranged;

FIG. 40 shows a continuous tensioning flexible stanchion, which is attached at one end to the upper concave mesh unit, where the reflective mesh is directly attached to the upper concave mesh unit, and the other end is attached to the edge unit of the tensioning spring, where a screw device for adjusting the length of the tensioning spring is arranged;

FIG. 41 shows a telescopic limiter mounted to adjust the distance between the oriented unit of the upper cord of the deploying ring and the oriented unit of the lower cord;

FIG. 42 shows an internal view of an individual section of the deploying ring (embodiment V);

FIG. 43 shows the external view of an individual section of the deploying ring (embodiment V);

FIG. 44 shows the individual section of the deploying ring (embodiment V) in a semi-folded state, external view;

FIG. 45 shows the individual section of the deploying ring (embodiment V) in a semi-folded state, external view, interior view.

Figure 1:
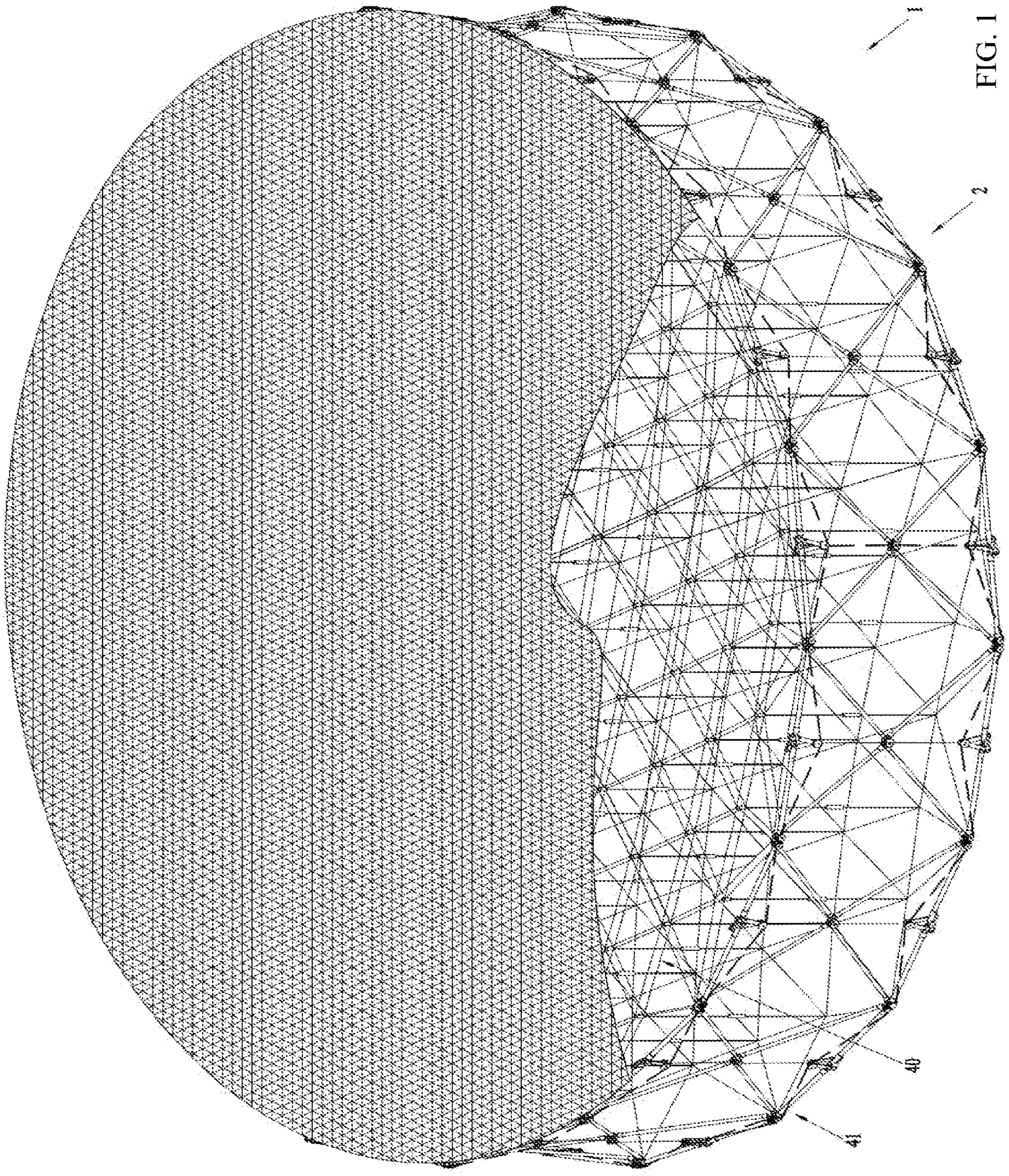
FIG. 1 shows a tensioning frame of the reflector with meshes, in a deployed state.
Figure 2:
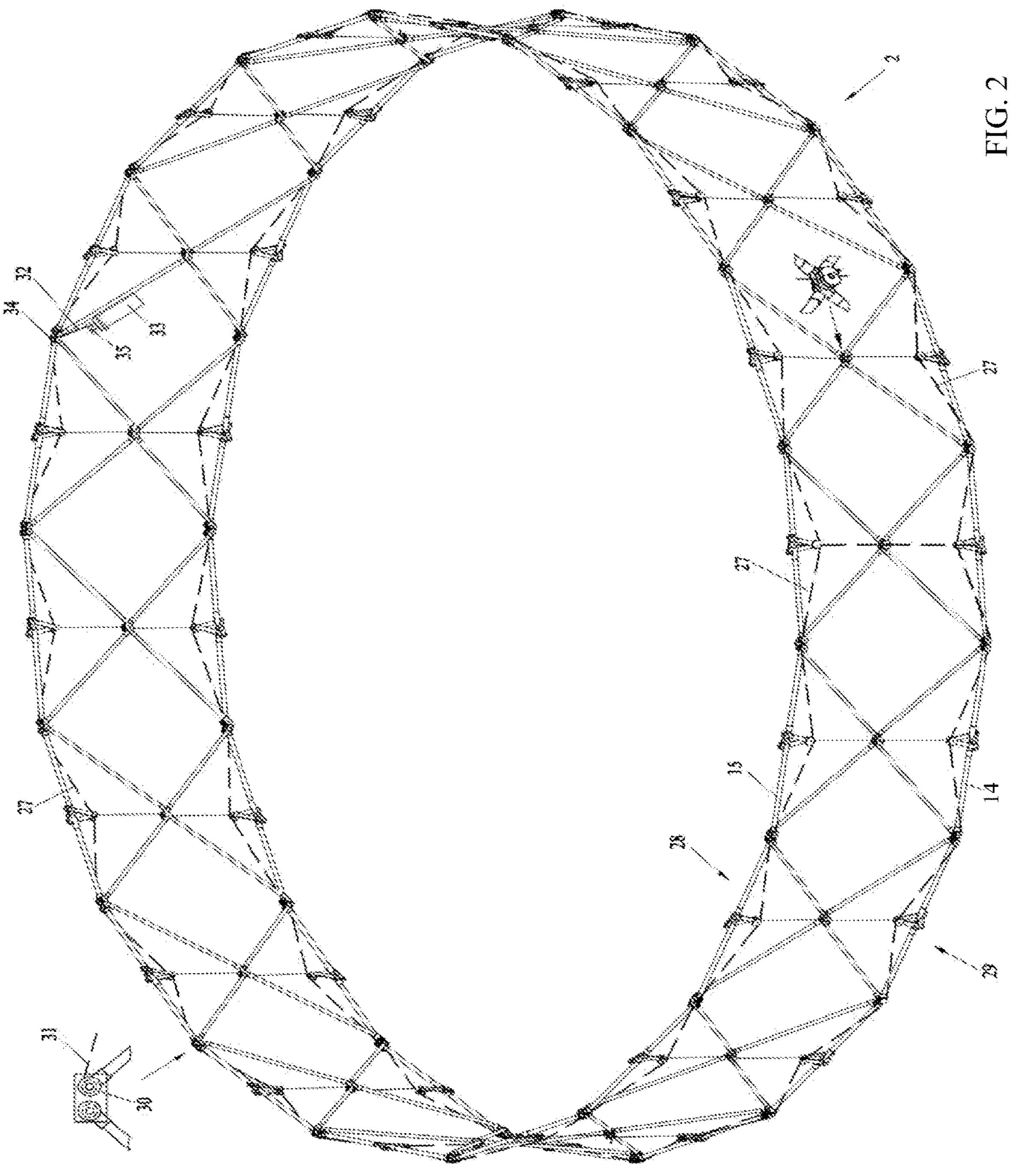
FIG. 2 shows a deploying ring in a deployed state with an electric drive mounted on a pantograph lever and a load-bearing cable winding drum.
Figure 3:
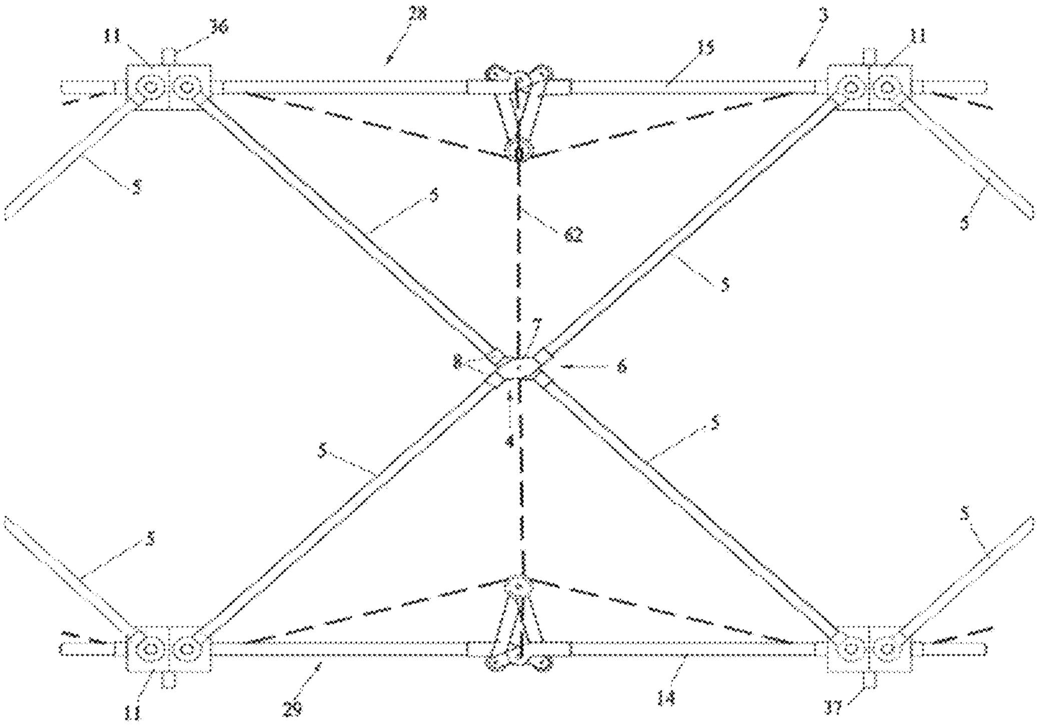
FIG. 3 shows the inside view of an individual section of the deploying ring.
Figure 4:
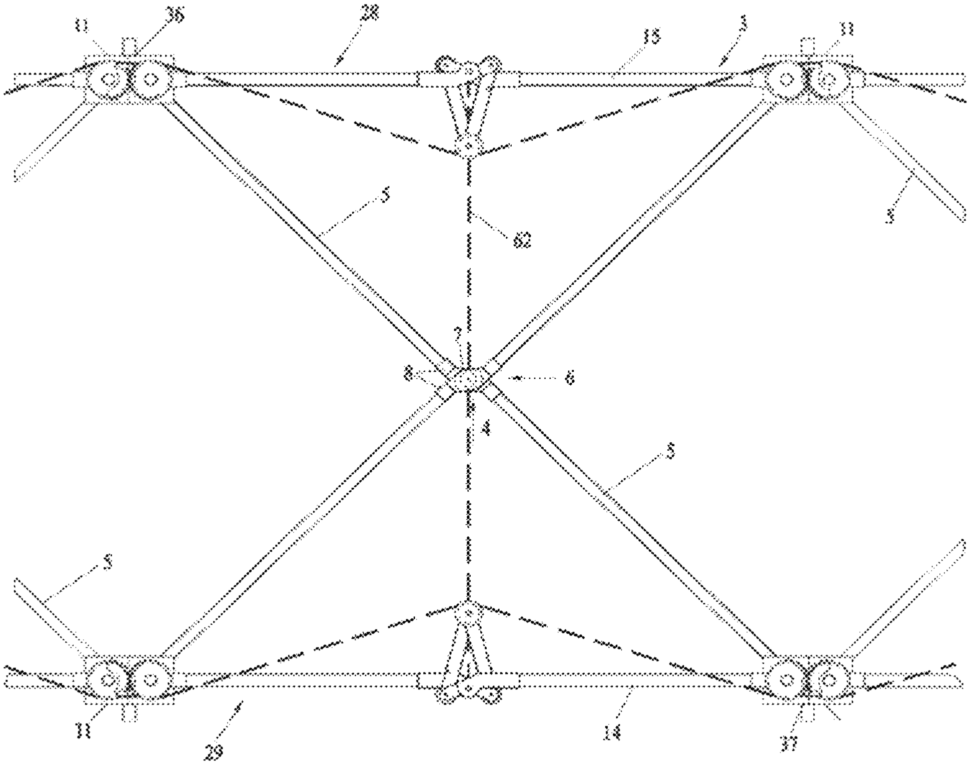
FIG. 4 shows the external view of an individual section of the deploying ring.
Figure 5:
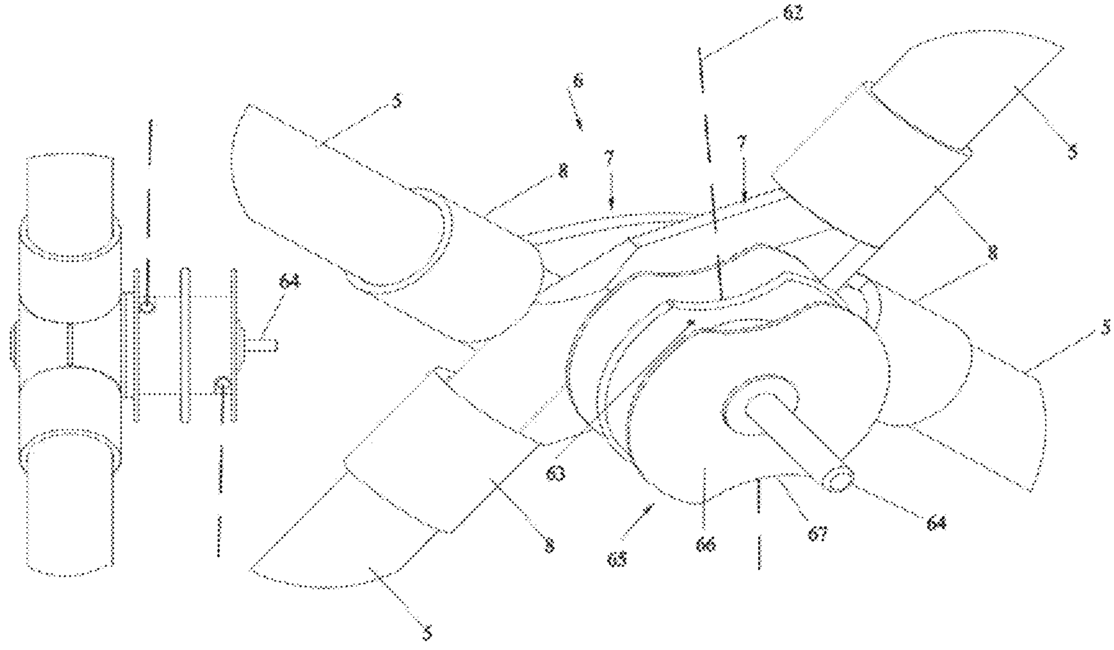
FIG. 5 shows the central cylindrical unit of the crosswise intersecting pantograph levers of the deploying ring, external view.
Figure 6:
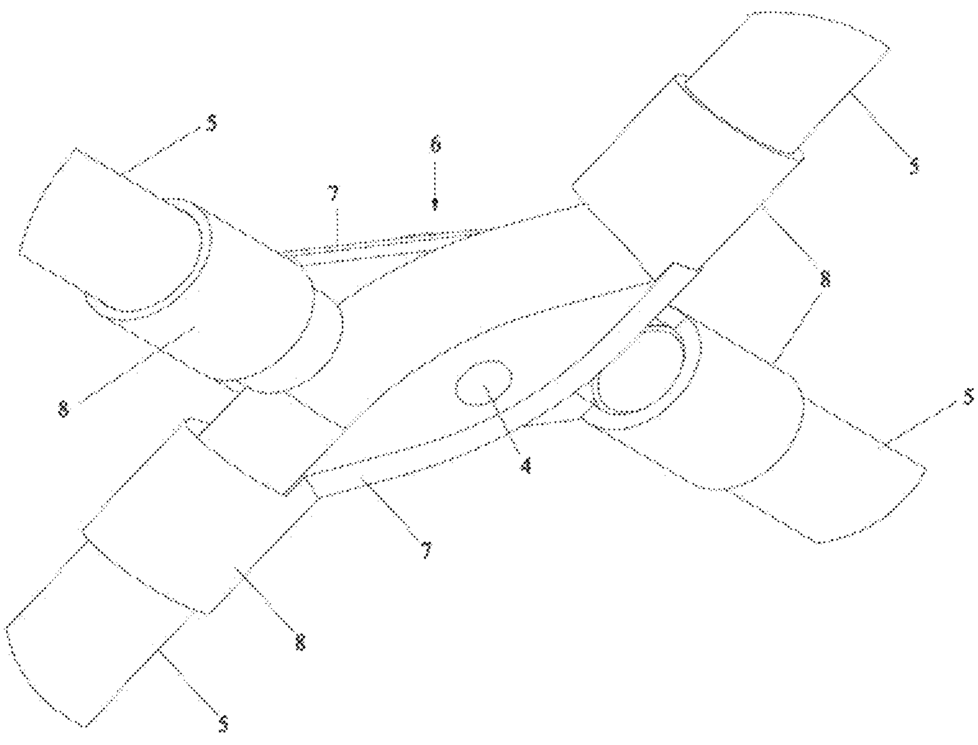
FIG. 6 shows the central cylindrical joint of the crosswise intersecting pantograph levers of the deploying ring, internal view.
Figure 7:
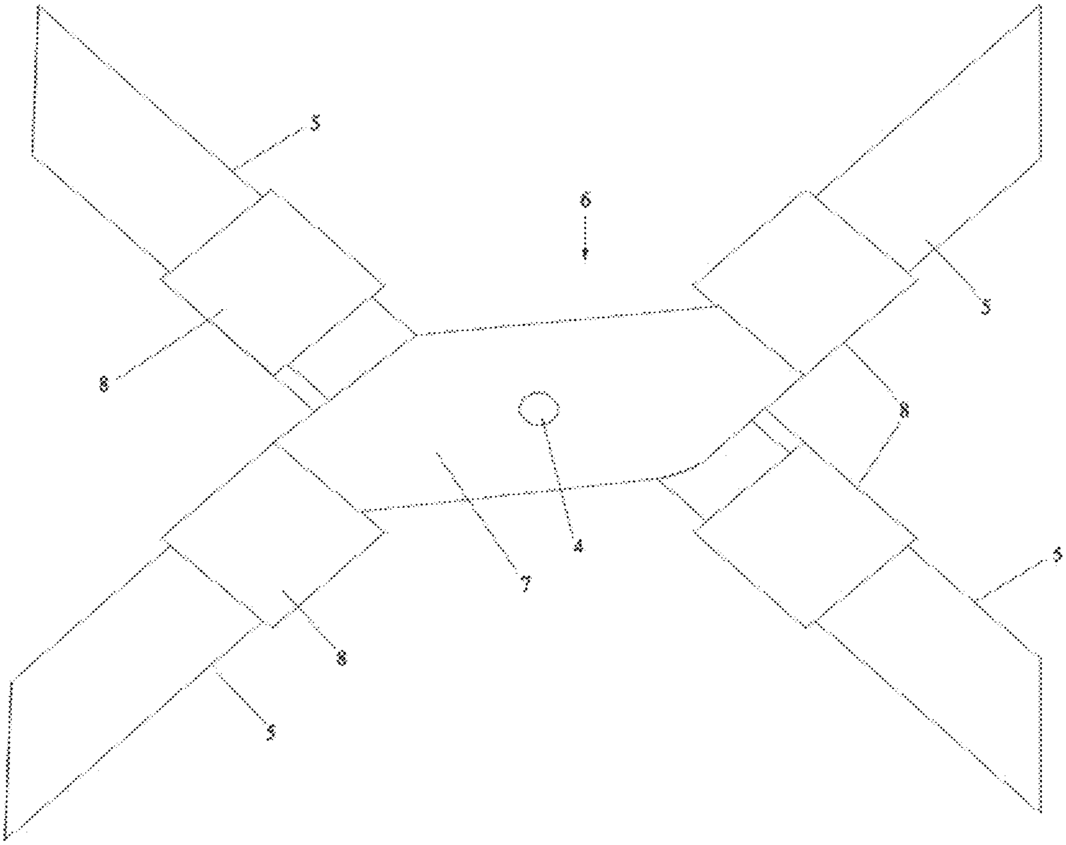
FIG. 7 shows the central cylindrical joint of the crosswise intersecting pantograph levers of the deploying ring, the front view.
Figure 8:
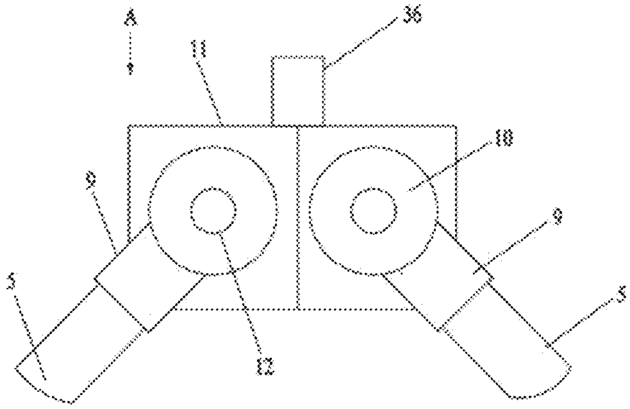
FIG. 8 shows the crosswise intersecting pantograph levers connected by cylindrical joints with the units oriented in the space of the upper and lower booms of the deploying ring.
Figure 9:
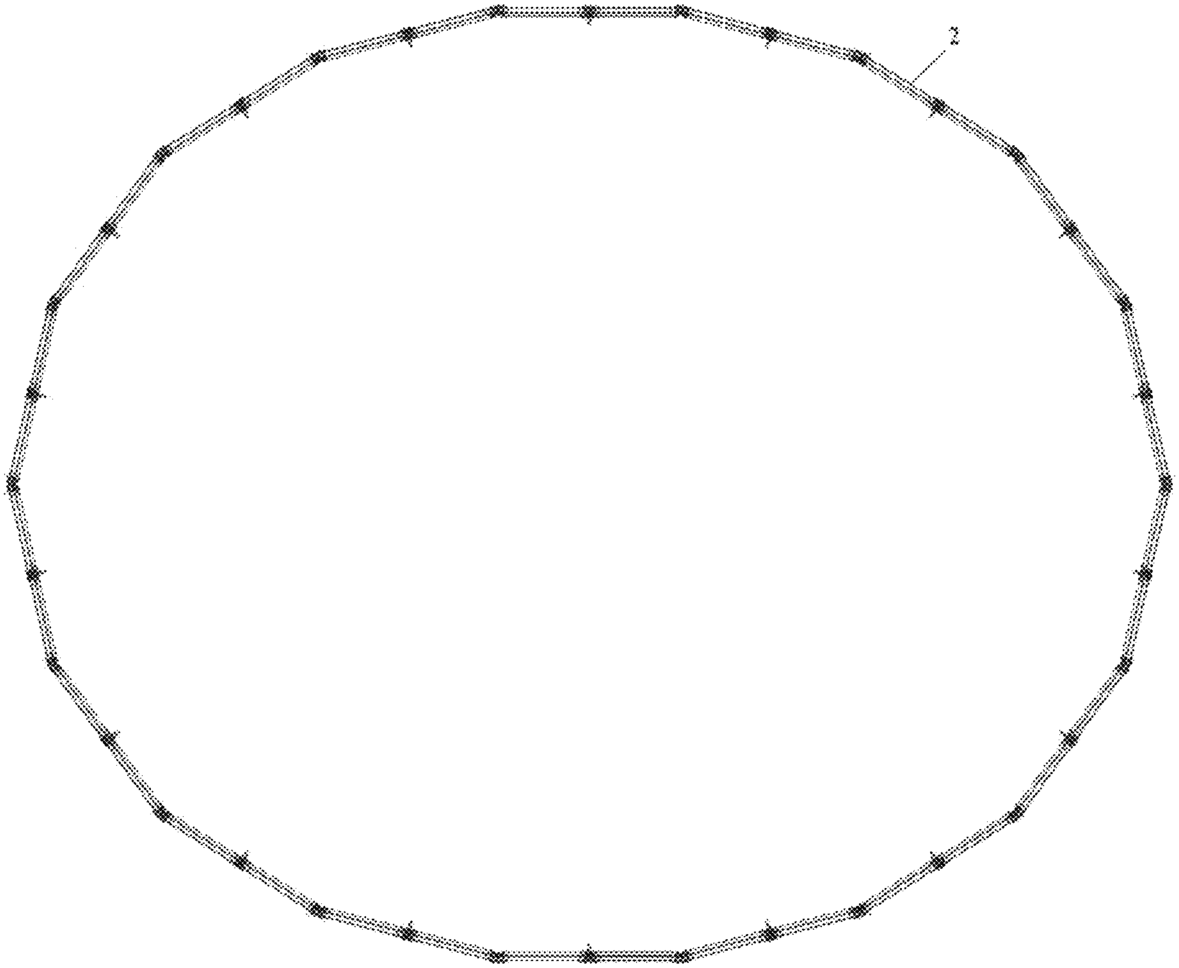
FIG. 9 shows the space-oriented units that ensure the oval shape of the deploying ring in the plan, overview.
Figure 10:
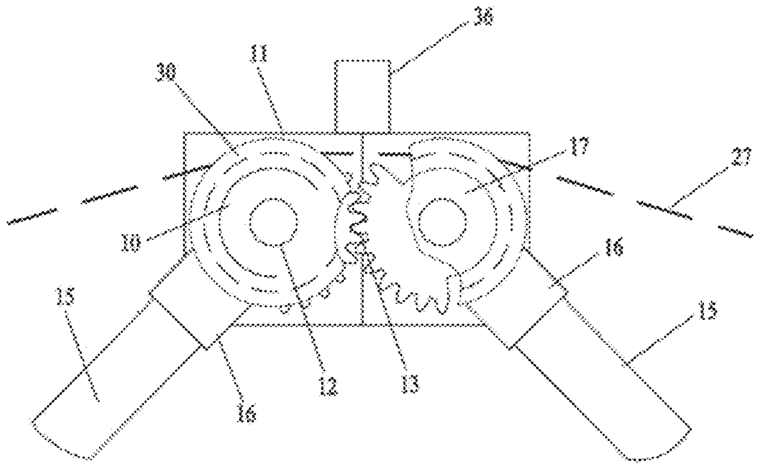
FIG. 10 shows the gear-type synchronizers arranged on the oriented units of the upper and lower booms of the deploying ring.
Figure 11:
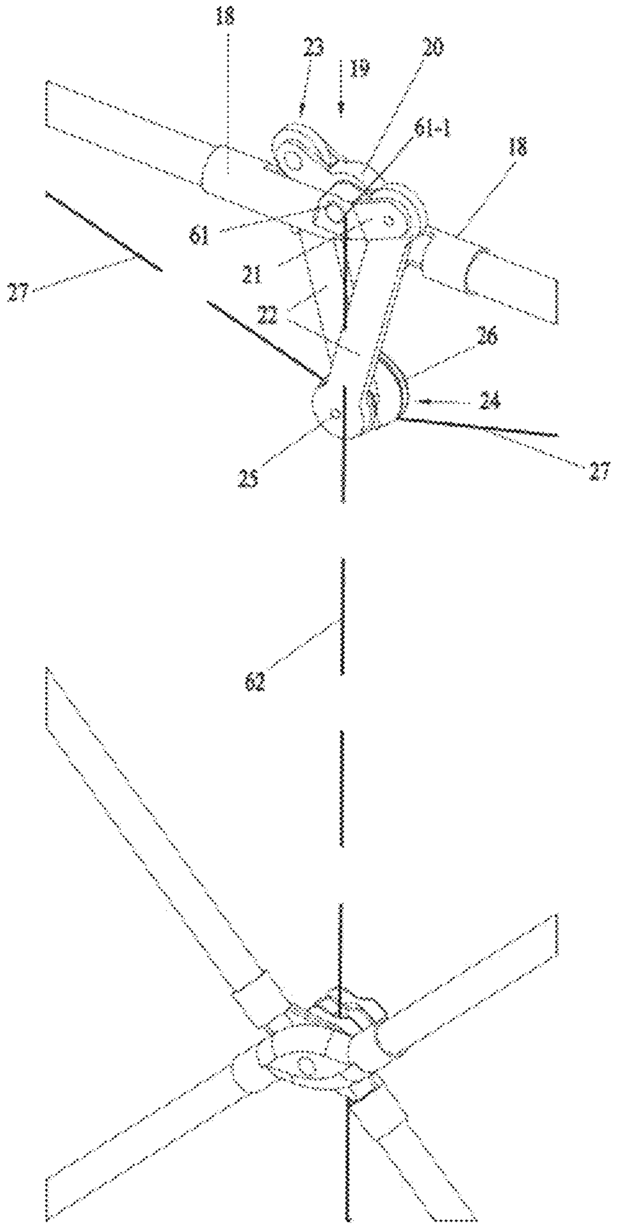
FIG. 11 shows a unit for connecting the folding rods with an integrating plate and rollers, whereon a load-bearing cable is led.
Figure 14:
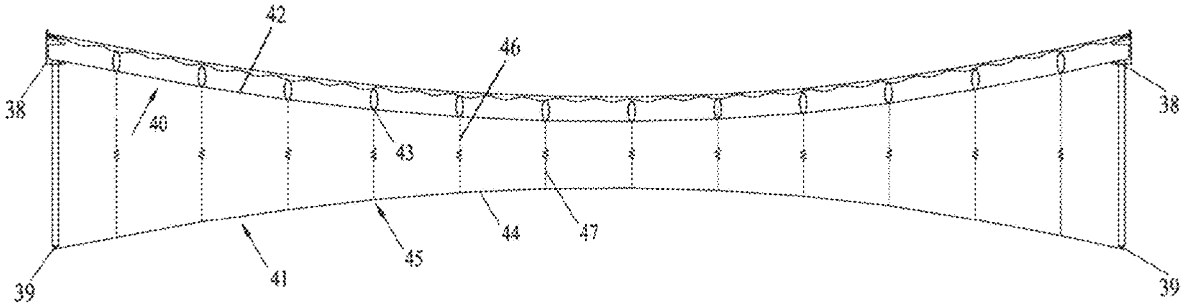
FIG. 14 shows the upper concave mesh and the lower convex mesh in the shape of a reflector triangular cells.
Figure 15:
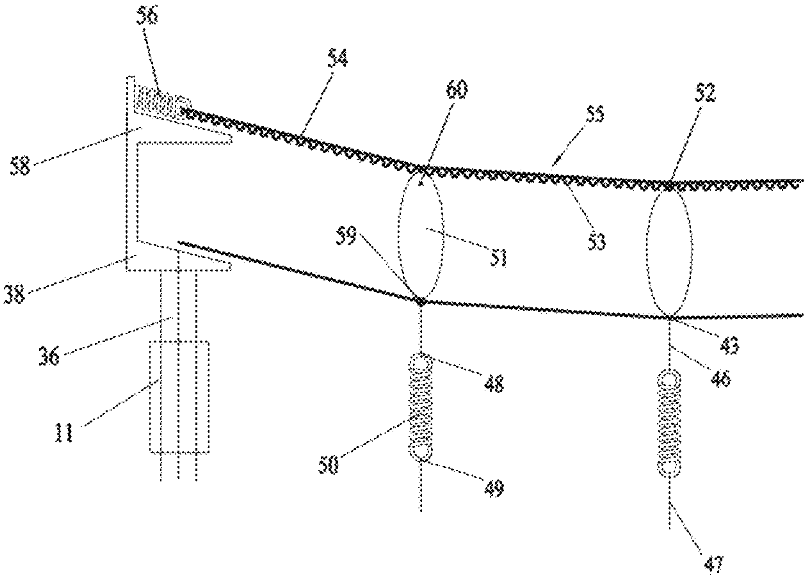
FIG. 15 shows a reflector fixing mesh attached to the periphery of the upper boom of the deploying ring with units having springs, together with the reflector.
Figure 16:
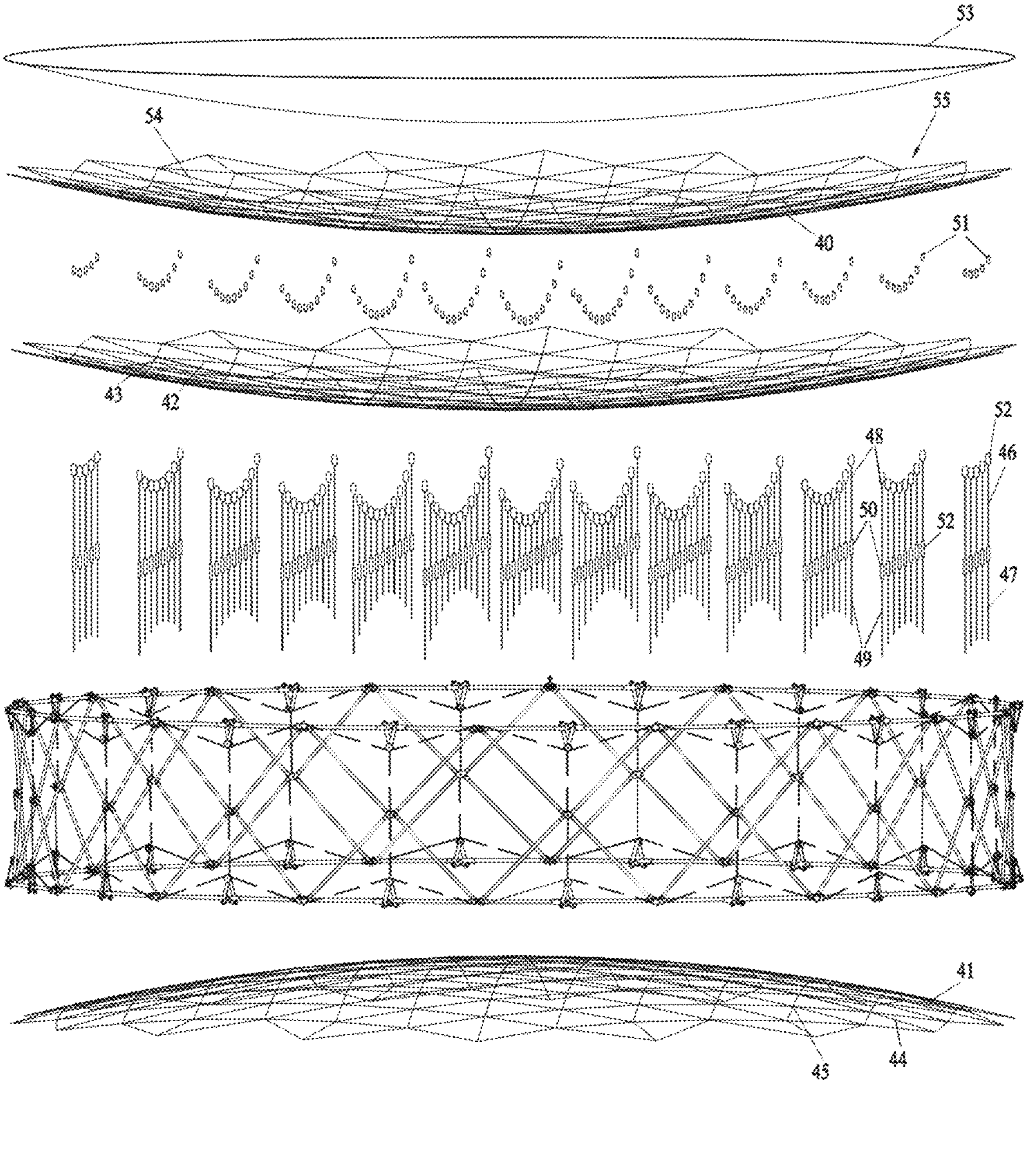
FIG. 16 shows the sequence of the positions of the reflective mesh (reflective mesh above the fixing mesh), the mesh of the reflector, the spatial-shape gaskets, the upper concave mesh, the flexible stanchions tensioned by springs in their upper parts, the deploying ring and the lower concave mesh.
Figure 17:
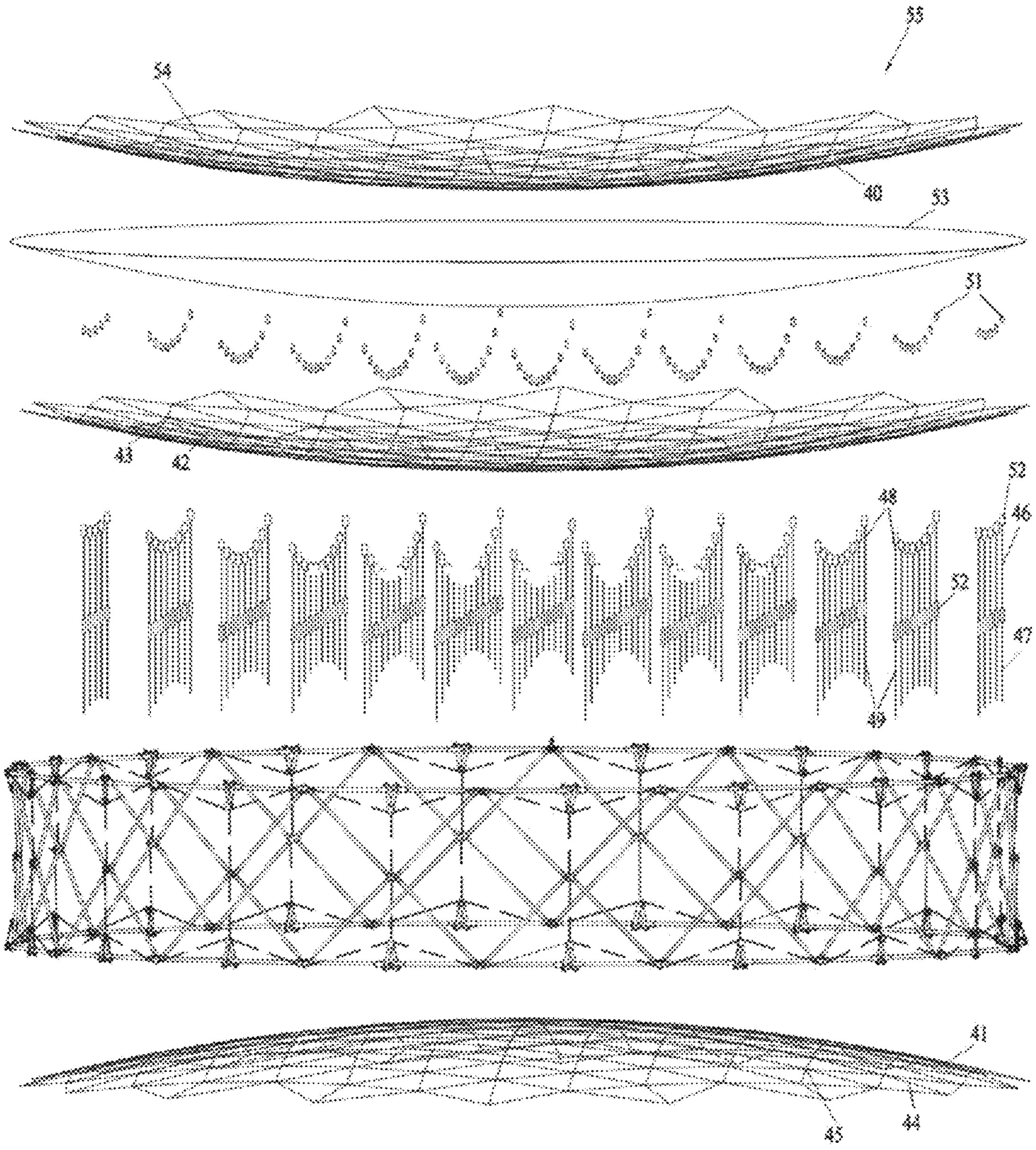
FIG. 17 shows the sequence of the positions of the reflective mesh (reflective mesh above the fixing mesh), the spatial-shape gaskets, the upper concave mesh, the flexible stanchions tensioned by springs in their upper parts, the deploying ring and the lower concave mesh.

The deployable reflector comprises a stretching frame 1 (FIG. 1), a stretching frame deploying ring 2 (FIG. 2) with sections 3 (FIG. 3 and FIG. 4), wherein the crosswise intersecting pantograph levers 5 provided with cylindrical joints 4 (FIG. 5, FIG. 6, FIG. 7) being disposed in each section. On the central unit 6 at the intersection of the pantograph levers 5, the scissors-like levers 7 are arranged, which, in addition to the misaligned position of the symmetry axes of the pantograph levers 5, by the capped sleeves 8 disposed thereon, provide symmetrical placement of the pantograph levers 5 in the plane of the section 3 and with respect to the axes of longitudinal symmetry. The second ends of the pantograph levers 5 (FIG. 7) are provided with capped sleeves 9 of units that are connected by cylindrical joints 10 to the spatially oriented units 11 (FIG. 8) and ensure an oval shape of a deploying ring 2 in the plan (FIG. 9). On the shafts 12 of the cylindrical joints 10 arranged on the deploying ring 2 of the stretching frame 1 (FIG. 10), the gear-type synchronizers 13 are disposed. The deploying ring 2 of the stretching frame 1 consists of hingedly interconnected lower foldable rods 14 and upper foldable rods 15, at the ends of which (FIG. 11) capped sleeves 16 are placed, and on these sleeves 16, cylindrical joints 17 are arranged. The second ends of the lower foldable rods 14 and upper foldable rods 15 are also provided with capped sleeves 18 that are connected to each other by cylindrical joints 20 at the connecting units 19 of the lower foldable rods 14 and the upper foldable rods 15. On the console protrusions 21 of the extension of the capped sleeves 18 located in the connecting units 19, one ends of plates 22 connecting the lower foldable rods 21 and the lower foldable rods 14 and upper foldable rods 15 are fastened with cylindrical joints 23, and the other ends of the connecting plates 22 are joined at cylindrical joints 24, and on the shafts 25 mounted therein, rollers 26 are disposed, on which a load-bearing cable 27 is led. The deploying ring 2 is a sections 3 of the upper 28 and lower 29 booms consisting of flexible lower foldable rods 14 and upper foldable rods 15 connected to each other hingedly, which ensures the oval shape of the deploying ring 2 of the stretching frame 1. On the rollers 30 disposed on the shafts 12 of the oriented units 11 of the upper 28 and lower 29 booms (FIG. 12), a load-bearing cable 27 is led in such a way that one end 31 of the load-bearing cable 27 is fixed to the roller 30 along the upper 28 and lower 29 booms, and the second end 32 is mounted in an electric drive 33 (FIG. 13) that is mounted on the roller 34 adjacent to the corresponding boom. The winding of the load-bearing cable 27 is carried out on a drum 35 mounted on the axis of the electric drives 33. On the upper protrusions 36 (FIG. 3) and lower protrusions 37 (FIG. 4) of the spatially oriented units 11 of fastening the upper 28 and lower 29 booms, an upper concave mesh 40 and a lower convex mesh 41 that have triangular cell shape are fastened respectively, by peripheral units 38 for the upper boom 28 fastening (FIGS. 14 and 15) and by peripheral units 39 for fastening the lower boom 29 (FIGS. 16 and 17). Units 43 of intersecting the upper concave mesh 40 rods 42 and, respectively, units 45 of intersecting the lower convex mesh 41 elastic rods 44 are connected to each other by stanchions consisting of tensioned, elastic upper 46 and lower 47 parts. A tensioning spring 50 is fastened by a unit 48 for attaching to the upper part 46 of the stanchion, and by unit 49 for attaching to the lower part 47 of the stanchion. The tensioning spring 50 is fastened in such a manner that a spatial shaped gasket 51 is attached to in the units 43 of the upper flexible mesh 40 with the lower ends, the upper ends of which are attached to a tensioned reflector 53 by means of reflector units 52 and to a mesh 55 for fixing a reflector 53 being formed by elastic rods 54 having triangular cell shape, that is fastened in the reflector units 52 (FIGS. 16 and 17).

The reflector fixing mesh 55 with units 56 provided with springs that are disposed on the periphery together with the reflector 53, are also attached to the protrusion 36 of the units 11 oriented in the space of the lower boom 29 (FIG. 15) and it is located on the extension of the peripheral units 38 of the upper boom 28, on the shelf 58 disposed above it in such a way that the size of each gasket 51 from the lower end 59 of the gasket 51 to the upper end 60 of the gasket 51 is variable and/or invariable. To a shaft 61 of the cylindrical joint 20 that connects the lower foldable rods 14 and the upper foldable rods 15 (FIG. 18), an elastic rod 62 is coupled, which is wound on a reel 65 disposed on a rotary axis 6(4) of the crosswise intersecting cylindrical unit 64 of the pantograph levers 5 by fastening with its second end 63 (FIG. 19), which has cutouts 67 on wings 66 which, in the folded state of the deploying ring 2, fix the plates 22 that connects the lower foldable rods 14 and upper foldable rods 15 (FIG. 20) (embodiment 1).

Figure 21:
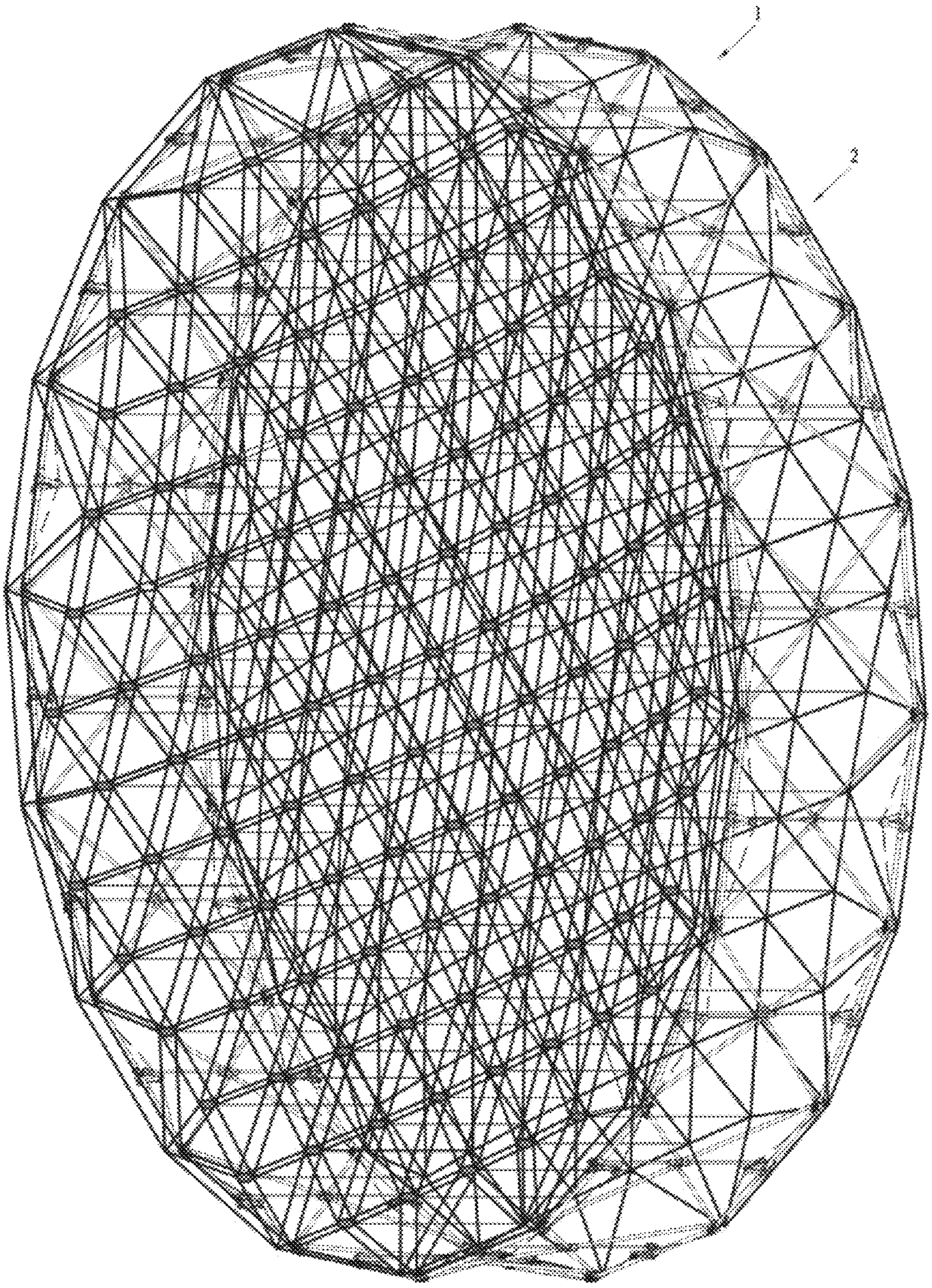
FIG. 21 shows a deployable reflector (embodiment II)
Figure 22:
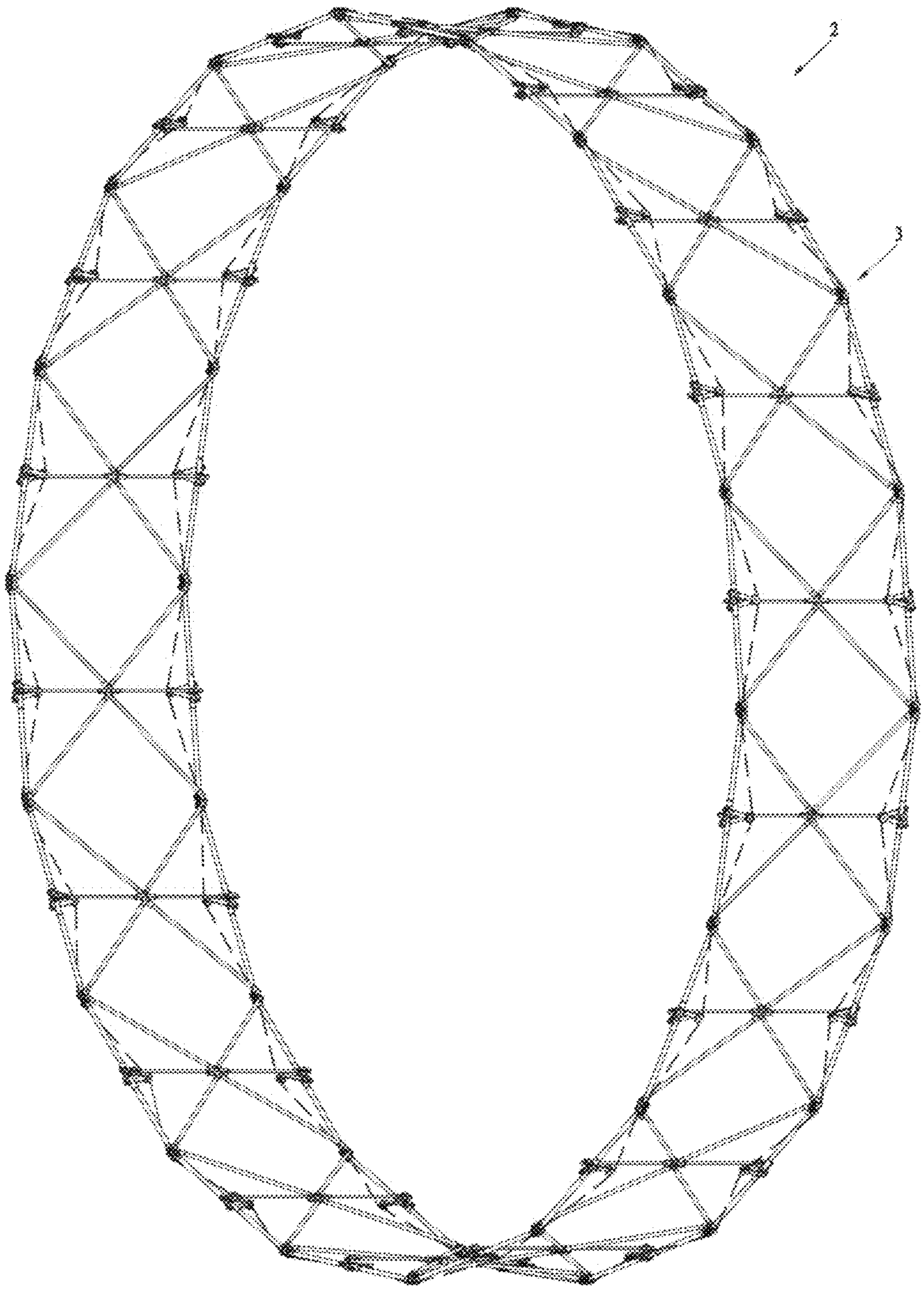
FIG. 22 shows a deploying ring (embodiment II) with an elastic rod inserted in the center of the crosswise intersecting pantograph levers.
Figure 23:
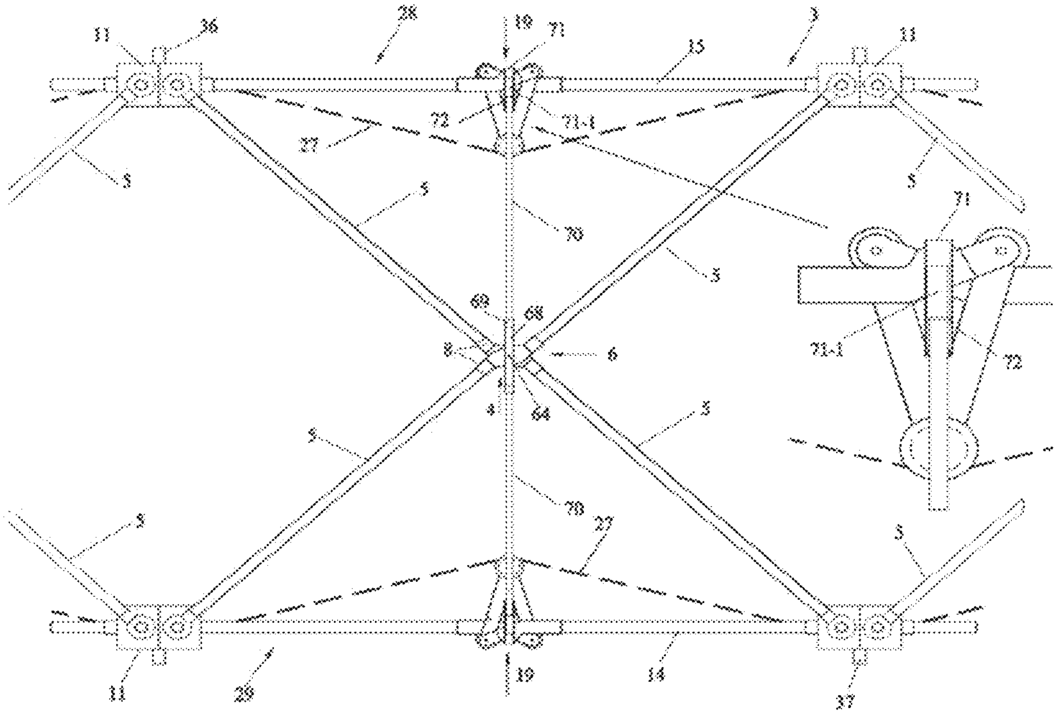
FIG. 23 shows the internal view of an individual section of the deploying ring (embodiment II)
Figure 24:
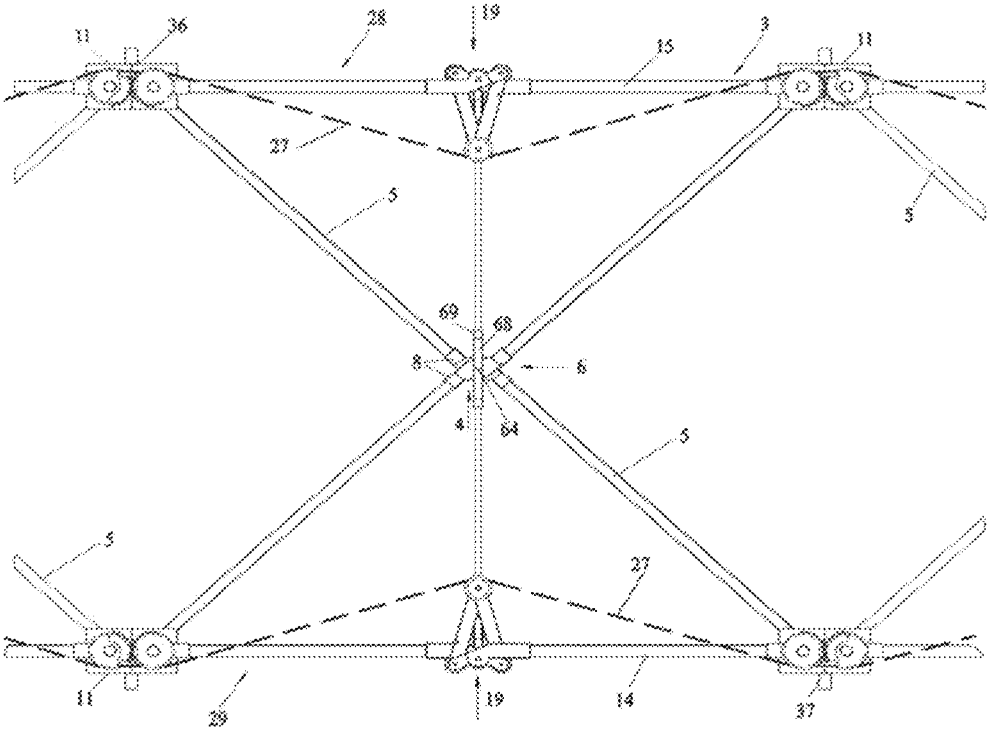
FIG. 24 shows the external view of an individual section of the deploying ring (embodiment II)
Figure 25:
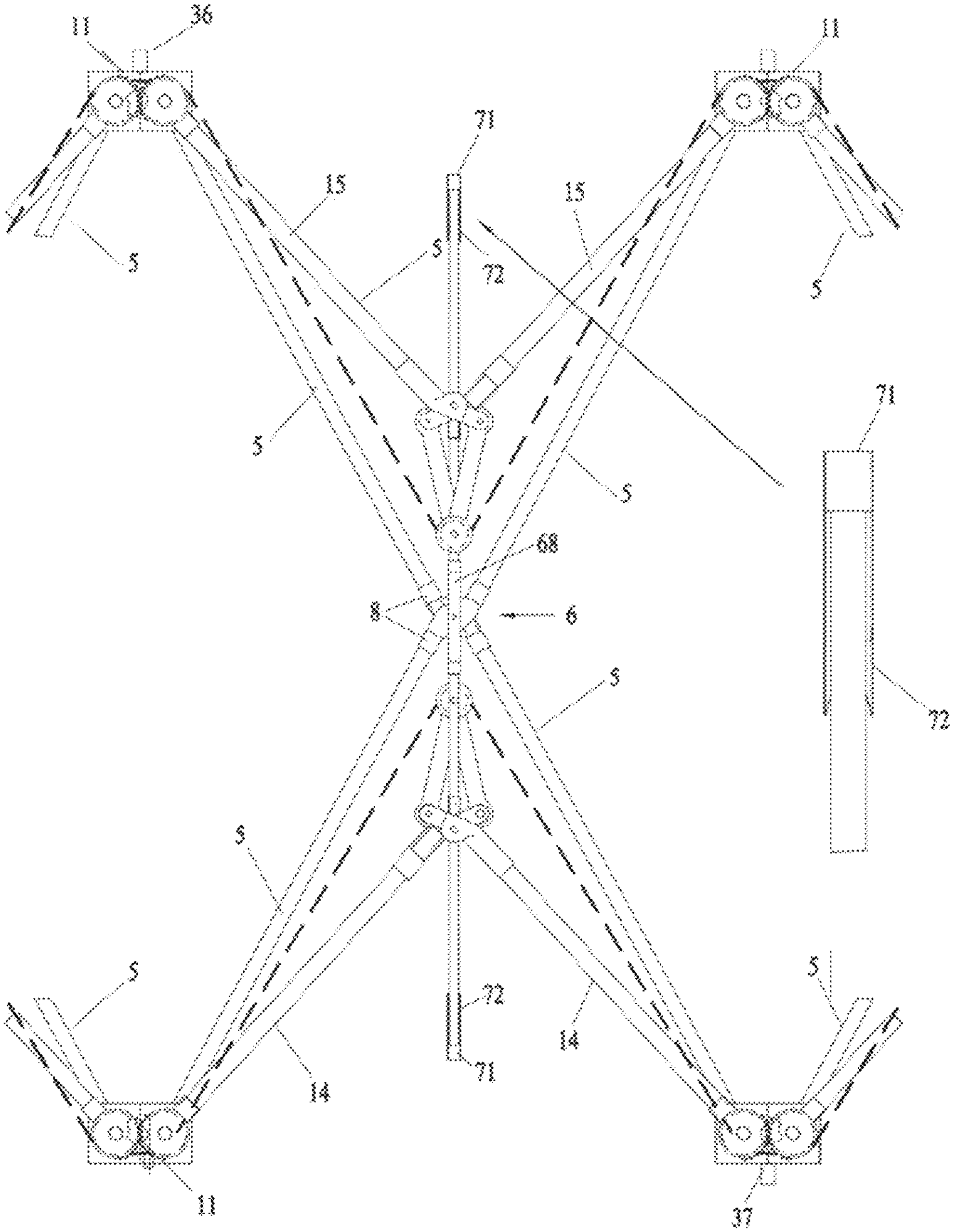
FIG. 25 shows an individual section of the deploying ring (embodiment II)

By means of a fastening means 68 disposed on the rotary axis 64 of the central unit 6 of each section 3 (FIG. 23) of the deploying ring 2 (FIG. 22) of the tensioning frame 1 (FIG. 21) of the deployable reflector, whereon tubes 70 are fastened by units 69 at the side of the upper 28 and lower 29 booms, the second ends of which reach the cylindrical unit 19 connecting the lower fordable rods 14 and upper foldable rods 15 of the tensioning frame 1 of the deployable reflector antenna at both sides (FIG. 24). Caps 71 with locking means 72 are fit to the ends of the tubes 70. By means of the caps 71, bearer 71-1 of the tube disposed on the shaft 61 (FIG. 26) of the cylindrical joint 20 that connects the foldable rods 15 during the full deployment of the upper 28 and lower 29 booms is fixed, that is displaced by influence of the deploying load-bearing cable 27 on the roller 26 disposed at the end of the plates 22 connecting the upper foldable 15 rods (embodiment 2).

On the second ends of the foldable lower rods 14 and upper rods 15 of the tensioning frame 1 (FIG. 27) deploying ring 2 (FIG. 28), synchronising gears 72-2 are fixedly arranged (FIGS. 29 and 30). The synchronizing gears 72-2 abut one another in the connecting unit structure 73, wherein the synchronizing gears 72-2 with appropriate shafts 74 are movably fastened in the nodal structure sheet 75. The nodal sheet 75 has a console 76 directed towards the central cylindrical units 6 of intersection of the pantographic levers 5 (FIG. 31), and at the ends of which, rollers 77 are disposed whereon load-bearing cables 27 are led. The nodal structure 73 has a bearer 78 that slides on the tube 70, which, by the means of rigid clip 80 in the central area, is mounted on the rotary axis 64 of the central cylindrical unit 6 from the inside of the deploying ring 2 and has caps 81 disposed at it's ends. The caps 81 are provided with the bearer 78 retainer mechanism 82 when they are in the fully deployed state of the upper foldable rods 15 (FIG. 30) (embodiment 3).

The gasket 51 having the spatial shape (FIG. 32) consists of the lower 59 and upper 60 portions and an additional gasket 83 disposed between them, by changing the number of which increase in (FIG. 34) or decrease of (FIG. 35) the length of the gasket 51 occurs. The spatial gasket 51 can be constructed also as a mechanism (FIG. 36), the length of which is variable. In the lower part 59 and the upper part 60 of the spatial gasket 51, a double-sided screw 87 having different direction screw 86 is disposed between screw sockets 85, rotation of which causes changing in the length between the lower part 59 and upper part 60 of the spatial gasket 51.

Additional elastic rods 88 are disposed at the side the units 52 of the elastic mesh 55 for fixing the reflector 53 (FIG. 37)

and they are eliminated at the neighbouring units 52 in order to equalize the levels conditioned by the fastening the elastic rods 54 in the units 52 when the elastic rods 54 of the reflector 53 fixing mesh 55 are arranged at different levels.

In the inner space of the spring 50, located between the upper part 46 of the flexible stanchion and the lower part 47 of the flexible stanchion, there is a telescopic limiter 89 of over-stretching a spring 50, at the end units 90, 91 of which the upper end 48 of the spring and the lower end 49 of the spring (FIG. 38) are attached.

The upper concave mesh 40 having triangular cells is connected with a continuous elastic tensioning stanchion 92 (FIG. 39). The continuous elastic tensioning stanchion 92 with its one end is fastened in the unit 43 of intersection of the elastic rods 42 of the upper concave mesh 40 having triangular cells, and the other end is passed through the hole 93 made in the unit 45 of intersection of the elastic rods 44 of the lower convex mesh 41, and it is fastened to the unit 95 adjacent to a spring 94 abuted from outside of the unit 45 of intersection of the elastic rods 44 of the lower convex mesh 41. On the unit 95 adjacent to the spring 94 a screw device 96 for adjusting the tensioning spring 94 length is disposed in such a way that a latch 97 for limiting the displacement at the side of the tensioning spring 94 of the tensioning flexible stanchion 92 is fastened adjacent to the hole 93 made in the units 45 of intersection of the elastic rods 44 of the convex mesh 41 on the tensioning flexible stanchion 92 (FIG. 39).

The reflecting mesh 53 is directly attached to the elastic rods 42 of the upper concave mesh 40 having triangular cells, and to the units 43 of their intersection wherein the elastic rod 92 is fastened. The elastic rod 92 is passed through a hole 93 made in the unit 45 of intersection of the elastic rods 44 of the lower convex mesh 41 having triangular cells. The second end of the elastic rod 92 is disposed on units 95 adjacent to the tensioning spring 94 (FIG. 40), wherein a screw device 96 for adjusting the length of the elastic stanchion 92 is disposed in such a way that when passing through the hole 93 made at the unit 45 of intersection of the elastic rods 44 of the lower convex mesh 41 having triangular cells, it is provided with latches 98 and 99 at both sides of the hole 93 for limiting the further displacement (FIG. 40).

A telescopic limiter 100 is attached for adjusting the distance between the upper boom 28 oriented unit 11 of the tensioning frame deploying ring 2 and the lower boom 29 oriented unit 11, the outer tube 101 (FIG. 41) of which is rigidly mounted in the upper oriented unit 11 and the inner tube 102 is also rigidly mounted in the lower oriented unit 11, with the capability of being regulated, which is performed by a thread made on an adjusting rod 103 and fixes the reflector antenna in the design position when the deployment process is completed (FIG. 41).

By the fastening means 68 disposed on the rotary axis 64 of the central unit 6 of each section 3 (FIG. 23) of the deploying ring 2 (FIG. 22) of the tensioning frame 1 (FIG. 21) of the deployable reflector, whereon the tubes 70 are fastened by units 69 at the side of the upper 28 and the lower 29 booms, the other ends of which reach the axis of a roller 105 disposed above the cylindrical unit connecting the lower foldable rods 14 and upper foldable rods 15 of the deployable reflector tensioning frame 1 (FIGS. 42 and 43), wherein the caps 71 with locking means 72 for putting on the ends of the tubes 70 are fastened, by means of which the tube bearer 71-1 disposed on the shaft of the cylindrical joint 20 connecting the foldable rods when the upper 28 and lower 29 booms are fully deployed, which is displaced through the roller 104 disposed on the cylindrical joint connecting the lower foldable rods 14 and upper foldable rods 15, led over the roller 105 disposed at the end of the tube 70, than returned back to the roller 104 and passed to the neighbouring section 3 by the influence of the deploying load-bearing cable 27 (FIGS. 44 and 45) (embodiment 4).

Transition of the tensioning frame of the deployable reflector from its folding state to the deployed state is performed in the following manner.

Figure 12:
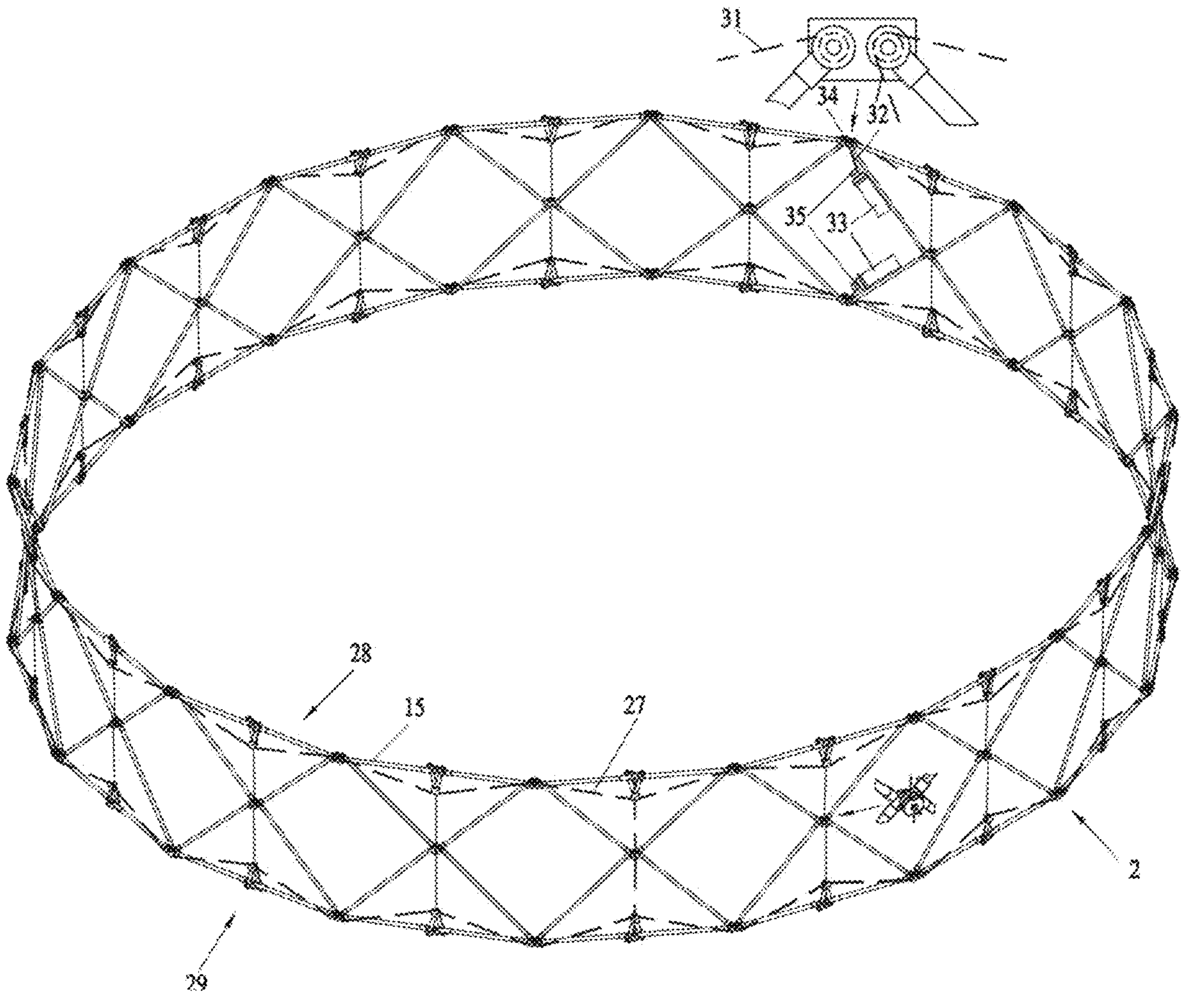
FIG. 12 shows the layout diagram of the load-bearing cable of the deploying ring and electric drives.
Figure 13:
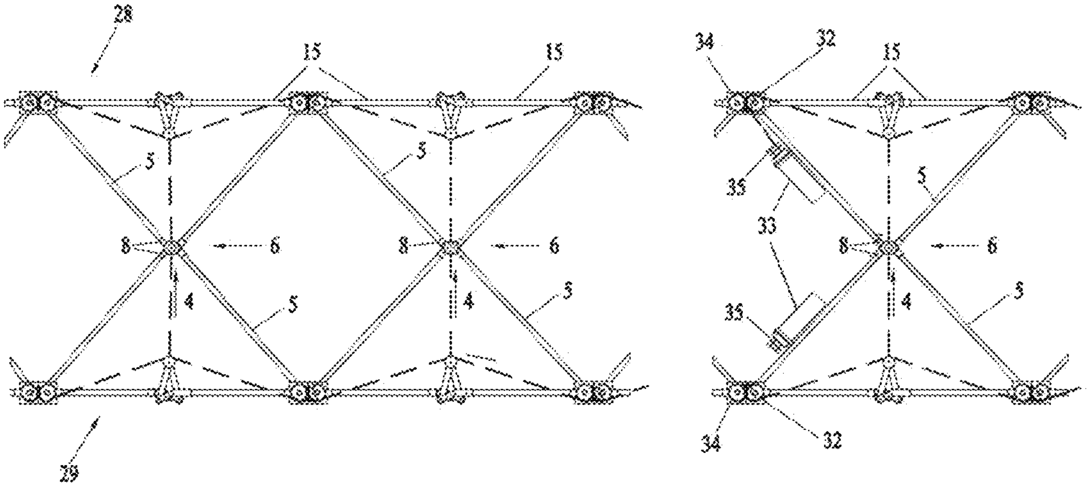
FIG. 13 shows the layout diagram of the load-bearing cable and electric drives in an individual section of the deploying ring.

Transition of the deploying ring 2 (FIG. 2) of the tensioning frame 1 (FIG. 1) of the deployable reflector from its folding transportation state (FIG. 20) to the designed deployed state is performed by two independent electric drives 33 (FIGS. 12 and 13) disposed on the pantograph levers 5 intersecting crosswise by the central cylindrical joint 4 (FIGS. 5, 6, 7) of the individual section 3 (FIGS. 3 and 4) of the deploying ring 2, after switching on of which the load-bearing cable 27 wound on the drum 35 mounted on the electric drive 33 axis, which is led separately, onto the rollers 30 (FIG. 10) put on the shafts 12 of the cylindrical joints 10 of the units 11 oriented in the space of the upper boom 28 and lower boom 29, and onto the roller 26 which is arranged on the shaft 25 in the cylindrical joint 24 of the plates 22 connecting foldable lower 14 and upper 15 rods, one end 31 of which is fixed on the roller 30, and the second end 32 is fastened in the electric drive 33 mounted on the roller 34, is deployed and influencing on the rollers 26 of the units 19 (FIG. 11) connecting the load-bearing cable 27, the tensioning force of the load-bearing cable 27 is transferred to the connecting plates 22, one ends of which will rotate about the shaft 25 disposed in the cylindrical joint 24, and the other ends will rotate about the cylindrical joints 23 disposed of the console-like projections 21 of the extension of the sleeves 18 designed for putting on the lower foldable 14 and upper foldable rods. At the same time, the ends of the lower 14 and upper 15 rods with the sleeves 18 intended to be put on, which are rigidly fastened at both sides of the foldable lower 14 and upper 15 rods, will start rotating about the cylindrical joint 20 disposed in the unit 19 connecting the foldable lower 14 and upper 15 rods. As a result, the connecting plates 22 and, respectively, the foldable lower 14 and upper 15 rods will start deploying. Besides, in the process of being deployed, the cylindrical joints 17 arranged on the sleeves 16 intended for putting on the foldable lower 14 and upper 15 rod ends that are disposed on the shafts 12 (FIGS. 8 and 10) of the cylindrical joints 10 of the spatially oriented units 11, and the gear synchronizers 13 rigidly connected thereto ensure synchronized deployment of the deploying ring 2 of the tensioning frame 1 of the reflector, start rotating. As a result of increase in the distance between the spatially oriented units (the reflector antenna central part fastening units) 11 for fastening the upper boom 28 and lower boom 29 (FIGS. 3, 4, 8, and 10), the deployment motion is transferred to the pantograph levers 5 and to the central part of the reflector 1 (FIGS. 1, 14, 15, 21, and 27), which, together with the cylindrical joints 10 of the sleeves 9 put on the ends, start rotating about the shaft 12 of the oriented units 11. The cylindrical joint 4 that enables crosswise intersection of the scissors-type levels 7 disposed on the sleeves 8 fastened on the second ends of the pantograph levels 5 start rotating about the shaft 64 existing in the central unit 6 arranged at the point of intersection of the crosswise intersecting pantograph levers 5. At the same time, the elastic rod 62 is mounted with one end on the shaft 61 (FIG. 18) of the cylindrical joint 20 connecting the foldable lower 14 and upper 15 rods, the other end of which, by means of the fastening 63, is wound on the reel 65 disposed on the rotary axis 64 of the cylindrical joints that intersects crosswise the pantograph levers 5 (FIG. 19). By means of the cutouts 67 existing on the reel 65 wings 66, in the folding state of the deploying ring 2 (FIG. 20), plates 22 that connect the foldable lower 14 and upper 15 rods are fixed, which start moving towards the vertical direction when the tensioning frame 1 of the reflector starts deploying, the reel 65, on which the elastic rods (cables) 62 fastened on the cylindrical joint 20 that connects the foldable rods 15 of the upper boom 28 and the foldable rods 14 of the lower boom 29 are fastened, is released, after which the reel 65 starts rotating and the elastic rods (cables) 62 having designed (fixed) length that are wound thereon are opened and location of the foldable lower 14 and upper 15 rods of the upper 28 and lower 29 booms are fixed in the designed state when the deploying ring 2 is fully deployed (FIGS. 12 and 13). Accordingly, the deploying ring 2, which is connected with the spatially oriented units 11 to the peripheral ends of the tensioning frame of the reflector 53, will assume the designed oval shape (FIG. 9).

Figure 20:
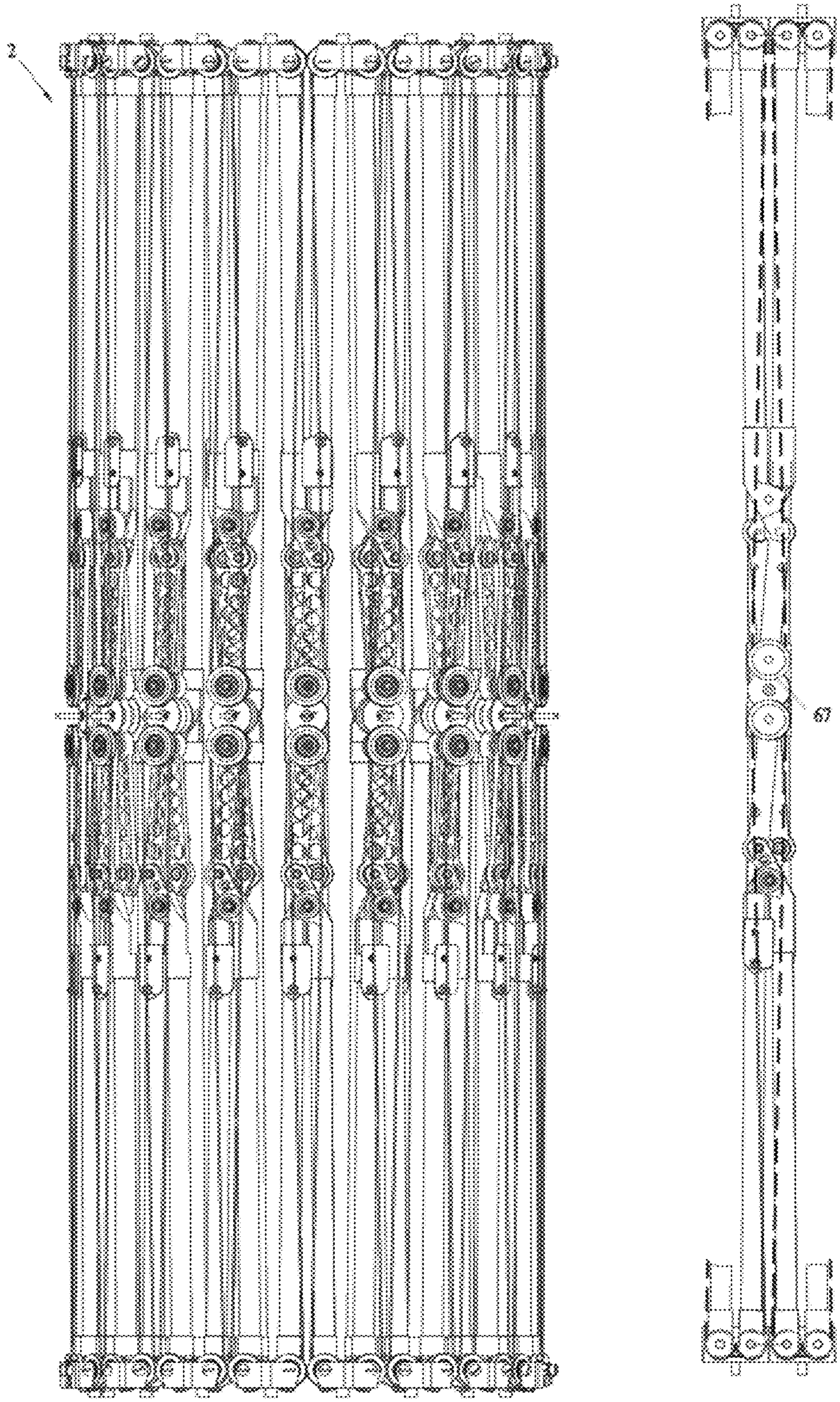
FIG. 20 shows a deployable reflector in a folded state.

Together with the deploying ring 2, the central part of the tentioning frame of the reflector starts deploying, which is folded in the internal space of the folded deploying ring 2 (FIG. 20). The upper concave 40 and the lower convex 41 meshes that are attached to the deploying ring 2 of the tensioning frame 1 of the reflector, starts moving together with all elements connected thereto. In particular, by means of the tensioning springs 50 fastened in the units 48 of connection with the upper portion and in the units 49 of connection with the lower portion of the flexible stanchions attached in the units 45 of intersection of the elastic rods 44 of the lower convex mesh 41 and in the units 43 of intersection of the elastic rods 42 of the upper concave mesh 40, in the internal space of which the telescopic limiter 89 against over-stretching the spring 50 is accommodated, in the terminal units 90, 91 of which the upper 48 and lower 49 ends of the spring 5 is attached (FIG. 38), interconnected by the stanchions consisting of the interconnected upper 46 and lower 47 parts, and by the peripheral units 38, 39 of fastening the upper 28 and lower 29 booms (FIGS. 14 and 15), the upper concave 40 and the lower convex meshes 41 (FIGS. 16 and 17) having triangular cells that are attached to the upper 36 and lower 37 projections of the spatially oriented units 11 (FIG. 4), also the reflecting mesh 53 and in order to equalize the levels of the rods disposed above or under the mech 53 and fastened in the reflector units 52 (FIG. 37) additional elastic rods 88, the reflector fixing mesh 55 consisting of the elastic rods 54, the spatial shape gaskets 51 fastened by lower ends 59 in the units 43 of the upper concave elastic mesh 40, the upper end 60 of which is attached to the reflector 53 and to the reflector fixing mesh 55 by means of the reflecting mesh 53 units 52, which, by means of the units 56 with springs disposed in the periphery, together with the reflector 53, is attached on the shelf 58 disposed above the peripheral units 38 of the boom 28 located on the projection 36 (FIG. 15) of the units 11 oriented in the space of the upper boom 28.

When the process of deployment of the deploying ring 2 finishes, the springs 50 disposed between the elastic rods that connect the upper concave 40 and the lower convex 41 meshes, and the springs 56 disposed in the periphery of the reflecting mesh 53 and the reflector fixing mesh 55, stretch with predetermined forces, the central part of the reflector tensioning frame 1 is tensioned and assumes the designed shape. In case of deviation of the central part of the reflector tensioning frame 1 from the designed shape, the change of the spatial shape gasket 51 (FIG. 32) length is performed by changing the number of additional gaskets 83 (FIGS. 33, 34, 35). In case the gasket 51 is a mechanism (FIG. 36), its length is regulated by rotating the shaft 87 disposed between the screw sockets 85 of the gasket 51 and having a screw 86 of different direction.

Unlike the first embodiment, a continuous tensioning stanchion 92 is possible (FIG. 39), the second end of which is fastened on the unit 95 at the side of a tensioning spring 94 abutted from outside of the unit 45 of intersection of the elastic rods 44 of the lower convex mesh 41, where the tensioning spring 94 length is regulated by a screw device 96, and a latch 97 that is attached adjacent to a hole 93 made in the lower convex mesh 41 at the unit 45 of intersection, limits the further movement of the tensioning flexible stanchion 92 towards the tensioning spring 94.

The third embodiment is also possible, wherein the reflecting mesh 53 is directly fastened on the upper concave mesh 40 (FIG. 40) and, unlike the second embodiment, latches 98 and 99 that limit the further motion of the tensioning stanchion 92 are arranged adjacent to the hole 93 made in the lower convex mesh 41 at the intersecting unit 45.

Figure 18:
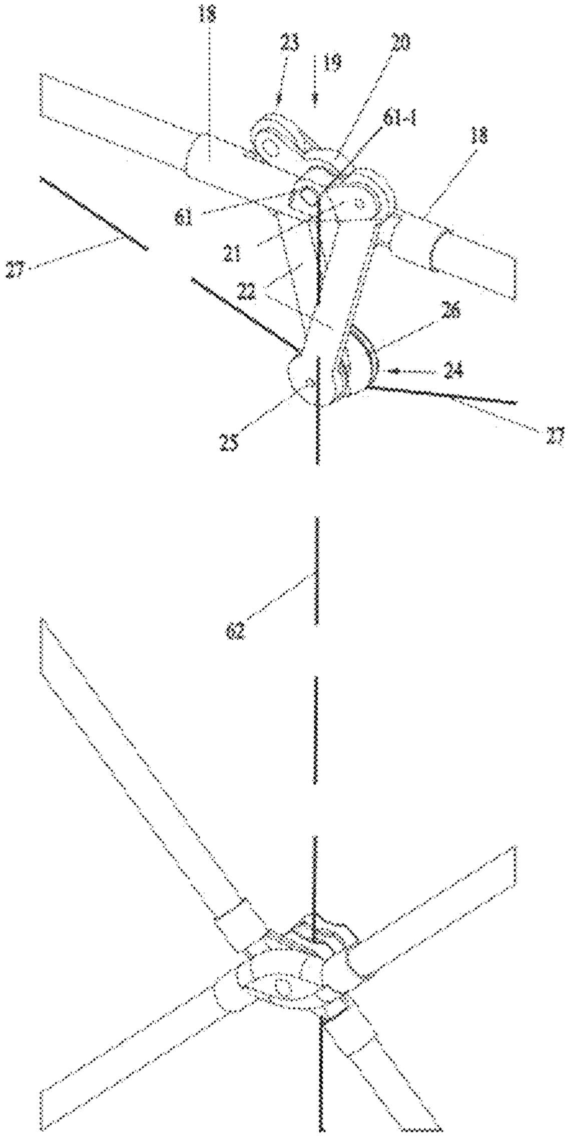
FIG. 18 shows an elastic rod attached to a cylindrical joint shaft that connect the foldable rods.
Figure 19:
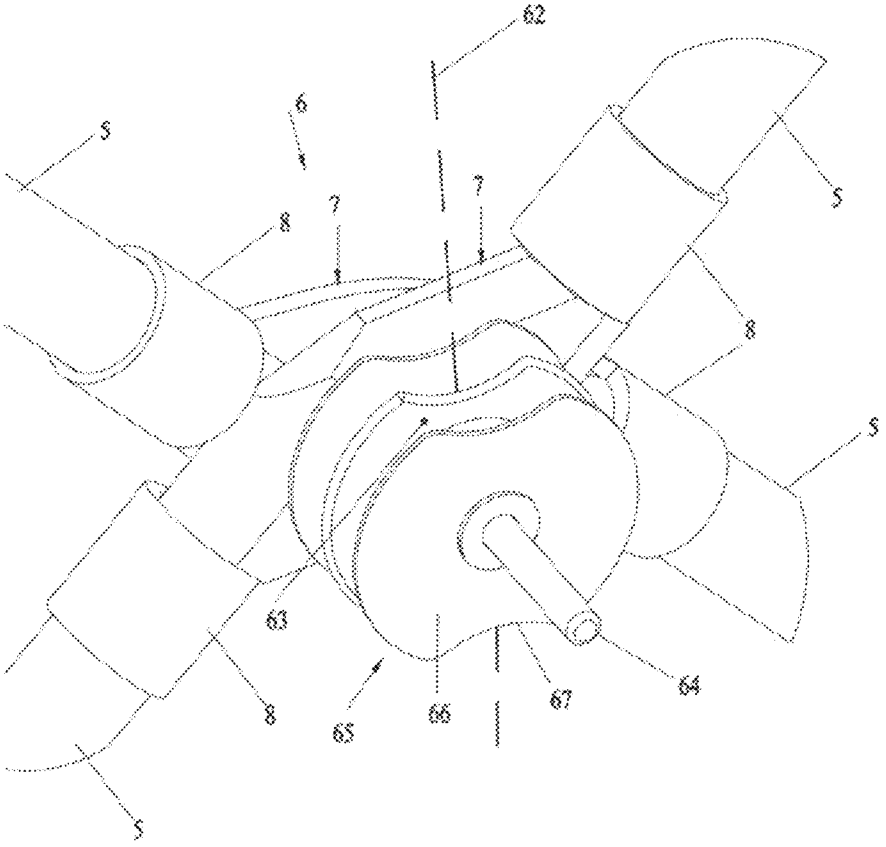
FIG. 19 shows a cylindrical joint of the crosswise intersecting pantograph levers of a deploying ring, on which with an elastic rod attached to a cylindrical joint shaft connecting the foldable rods to the shaft is fastened and wound.

In the process of deployment of every section 3 (FIG. 23) of the second embodiment of the deploying ring 2 of the reflector tensioning frame 1, on the tube 70 fastened by units 69 of the fastening means 68 arranged on the rotary axis 64 of the central unit 6, at the ends of which (at the cylindrical unit 19 that connects the foldable lower 14 and upper 15 rods), bearer 71-1 of the tube arranged on the shaft 61 of the cylindrical joint 20 that connects the foldable lower 14 and upper 15 rods is displaced on the roller 26 disposed at the end of the plates 22 connecting the foldable lower 14 and upper 15 rods by the influence of the deploying load-bearing cable 27 (see FIG. 18). When the upper 28 and lower 29 booms of the deploying ring 2 is fully opened, the locking means 72 arranged on the caps 71 fix the tube bearer 71-1.

In the process of deployment of every sections 3 of the third embodiment of the deploying ring 2 of the reflector deploying frame 1 (FIG. 28), by the influence of the deploying load-bearing cables 27 led on the rollers 77 disposed at the ends 76 of the key sheet 75 directed towards the central cylindrical unit 6 (FIG. 31) of intersection of the pantograph levers 5, the synchronizing gears 72-2 movably fastened in the key structure 73 sheet 73 by shafts 74, will be rotated and the foldable lower 14 and upper 15 rods that are fixedly fastened on the synchronizing gears 72-2 (FIGS. 29 and 30) will start deploying. On the tube 70 fastened on the rotary axis 64 of the central cylindrical unit 6 by means of a rigid fastening means 80, the bearer 78 moves. When the foldable rods are fully opened, the retaining mechanism 82 of the bearer 78 arranged on the caps 81 disposed at the tube 70 ends will fix the bearer 78 in the designed state.

In the process of deployment of every sections of the fourth embodiment of the deploying ring 2 of the reflector tensioning frame 1 (FIG. 41), the outer 101 and inner 102 tubes of the telescopic limiter 100 attached in order to adjust the distance between the oriented units 11 of the upper 28 and 29 booms, move and, after the full deployment, it is fixed in the designed state by means of the thread made on the adjusting rod 103 disposed on the inner tube 102.

In the still another fifth embodiment of the invention, by means of the fastening means 68 disposed on the rotary axis 64 of the central unit 6 of every section 3 (FIG. 23) of the deploying ring 2 (FIG. 22) of the tensioning frame 1 (FIG. 21) of the deployable reflector, whereon tubes 70 are fastened by units 69 at the side of the upper 28 and lower 29 booms, other ends of which at both sides reach the axis of the roller 105 disposed above the cylindrical unit that connect the foldable lower 14 and foldable upper 15 rods of the tensioning frame 1 of the deployable reflector (FIGS. 42 and 43), wherein the caps 71 with locking means 72 are fastened at the ends of tubes 70 to retain the bearer 71-1 disposed on the shaft 61 of the cylindrical joint that connects the foldable lower 14 and foldable upper 15 rods when the upper and lower booms are fully opened, which is capable of moving by the influence of the deploying load-bearing cable 27 led on the roller 104 disposed at the end of the tube 70, passing the roller 104 disposed on the cylindrical joint that connects the foldable lower 14 and upper 15 rods, than returning to the roller 105 disposed on the cylindrical joint and led on the neighbouring section (FIGS. 44 and 45).

In the description of the invention, a deployable reflector is provided that is used on spacecrafts as antennas. Due to its structural scheme, the deployable space reflector ensures reliability and simplicity of the reflector deployment, high rigidity, light weight, optimal shape of the transportation package, technical simplicity of the structure manufacturing, high accuracy of the geometrical shape of the reflector of the reflector antenna and repeatidy of the reflector surface shape after the repeated deployment of the structure.

The invention claimed is:

1. A deployable reflector comprising:

a reflector (53), the reflector (53) being composed of elastic rods;

a tensioning frame (1) having a deploying ring (2), the deploying ring (2) comprising upper booms (28) and lower booms (29), the upper booms (28) and the lower booms (29) being composed of lower rods (14) and upper rods (15) and connected to peripheral ends of the tensioning frame (1), the lower rods (14) and the upper rods (15) being hingedly interconnected, elastic, and foldable;

wherein the lower rods (14) and the upper rods (15) of the upper booms (28) and the lower booms (29) are connected to each other by spatially oriented units (11), the spatially oriented units (11) including foldable rods connecting consoles (76) and key sheets (75) attached to the foldable rods connecting consoles (76), and the lower rods (14) and the upper rods (15) are connected to a unit (52) of the reflector (53); and wherein the deploying ring (2) includes an opening mechanism, the opening mechanism having a drive (33), the drive (33) including a load-bearing cable (27), wherein a first end of the load-bearing cable (27) is coupled to a roller (30) placed at ends of the lower rods (14) and the upper rods (15) of the upper booms (28) and the lower booms (29), and a second end of the load-bearing cable (27) is mounted on an electric drive (33) and is capable of winding on a drum (35) mounted on a drive axis;

sections (3) composed of the lower rods (14) and the upper rods (15) of the deploying ring (2), each of the sections (3) including pantograph levers (5), the pantograph levers (5) being crosswise intersecting and interconnected by a cylindrical joint (4), an upper concave mesh (40), and a lower convex mesh (41) fastened with peripheral units of the upper concave mesh (40) and the lower convex mesh (41) in units (38, 39) of attachment of the upper concave mesh (40) and the lower convex mesh (41) to the upper booms (28) and the lower booms (29) of the deploying ring (2);

stanchions (46, 47) mounted between the upper booms (28) and the lower booms (29), the stanchions (46, 47) being flexible and including the elastic rods;

scissors-like levers (7) located on a central unit (6) at an intersection of the pantograph levers (5), wherein first sleeves (8) are put on the pantograph levers (5) from other side on ends of the pantograph levers (5);

second sleeves (16) disposed on ends of the lower rods (14) and the upper rods (15);

cylindrical joints (17) disposed on the second sleeves (16);

an expansion ring (2) including a connecting means for connecting the upper rods (15) and the lower rods (14), the connecting means being made in the form of:

an elastic rod (62) attached by one end to an axis (61) of an intermediate connecting cylindrical joint of the lower rods (14) and the upper rods (15) and fastened by other end on a reel (65) disposed on a rotary axis (64) of the cylindrical joints (5) that connect the pantograph levers (5) and capable of winding thereon; or a tube (70) disposed on wings cutouts (67) of the reel (65) for fixing plates (22) connecting the lower rods (14) and the upper rods (15) in a folded state; and a reflector fixing mesh (55) having triangular cells composed of the elastic rods (54), the reflector fixing mesh (55) being fastened in units (52) of connection of rods of the reflector (53), and having units (56) having springs (56) at an end of the units (56), the reflector fixing mesh (55) being fastened together with the reflector (53) in the units (38) of attachment of the upper concave mesh (40) and the lower convex mesh (41) to an upper boom of the upper booms (28), the units (38) being attached to a projection (36) of spatially oriented units (11) of the upper booms (28), on a shelf (58) located above the units.

2. The deployable reflector of claim 1, wherein the upper concave mesh (40) and the lower convex mesh (41) are composed of triangular shape cells and are connected by the units (52) of connection, wherein the upper concave mesh (40) and the lower convex mesh (41) are connected by sides of the units (52) of connection to the reflector (53); wherein, when the elastic rods (54) of the reflector fixing mesh (55) are positioned at different levels, additional elastic rods (88) are arranged on a reflector attachment side on the elastic rods (54) to equalize levels of the elastic rods (54) of the reflector fixing mesh (55); wherein the stanchions (46, 47) include flexible upper portions (46) and lower portions (47) mounted between the upper concave mesh (40) and the lower convex mesh (41) and are provided with tensioning springs (50) and with spring-length regulating devices mounted inside the tensioning springs (50) and made in the form of a telescopic limiter (89).

3. The deployable reflector of claim 1, wherein the reflector (53) is attached to intersection units (43) of the elastic rods of the upper concave mesh (40) directly, or lower ends of the reflector (53) are fastened in units (43) of the upper concave mesh (40) with a spatial shape gasket (51), and wherein upper ends of the reflector (53) are attached to units (52) and to the reflector fixing mesh (55) disposed above or under the reflector (53) when the reflector (53) is tensioned; and wherein the spatial shape gasket (51) is capable of changing a length between a lower part and an upper part of the spatial shape gasket (51).

4. The deployable reflector of claim 1, wherein the scissors-like levers (7) with the first sleeves (8) are designed for being disposed in a plane of a section (3) of sections (3) of the pantographic levers (5) and symmetrically with respect to axes of symmetry.

5. The deployable reflector of claim 1, wherein a plurality of load-bearing cables (27) are led separately on rollers placed on cylindrical joint axes of the spatially oriented units (11) of the upper booms (28) and the lower booms (29), wherein first ends of the plurality of load-bearing cables (27) are coupled to a roller (30) along the upper booms (28) and the lower booms (29) and second ends of the plurality of load-bearing cables (27) are coupled to electric drives (33).

6. The deployable reflector of claim 5, wherein the electric drives (33) are fastened on one of the rollers of the upper booms (28) and the lower booms (29), and drums (35) for winding the plurality of load-bearing cables (27) are fastened on an axis of the electric drives (33).

7. The deployable reflector of claim 1, further comprising flexible stanchions (92) connecting the upper concave mesh (40) and the lower convex mesh (41), wherein one end of the flexible stanchions (92) is fastened in the units (43) of intersection of the triangular cells included in the upper concave mesh (40), and other end is passed through a hole (93) made in a unit (45) of intersection of elastic rods (44) of the lower convex mesh (41) and fastened on the unit (45) of intersection of the elastic rods (44) of the lower convex mesh (41) at an end of a length adjusting screw device (96) disposed within a tensioning spring (94) abutted from outside, and wherein a latch (98, 99) for limiting the tensioning spring (94) of the flexible stanchions (92) is attached adjacent to the hole (93) made in the unit (45).

8. The deployable reflector of claim 7, wherein the flexible stanchions (92) include latches (97, 98, 99) for limiting movement of a spring arranged adjacent to the hole (93) at both sides; and wherein the flexible stanchions (92) connecting the upper concave mesh (40) and the lower convex mesh (41) are made as the stanchions (46, 47), the stanchions (46, 47) being double-portion, and the tensioning springs (50) and the telescopic limiters (89) are fastened between the double portions (46, 47).

9. The deployable reflector of claim 8, wherein one ends of the stanchions (46, 47) are fastened in the units (43) of intersection of triangular cells that are included in the upper concave mesh (40), and other ends of the stanchions (46, 47) are fastened in the units (45) of intersection of the triangular cells included in the lower concave mesh (41).

10. The deployable reflector of claim 1, wherein the additional elastic rods (88) are disposed between elastic mesh units and neighboring units.

11. The deployable reflector of claim 1, wherein the reflector (53) is fastened in the units (43) of the upper concave mesh (40), wherein lower ends of the reflector (53) are fastened by the spatial shape gasket (51) and upper end of the reflector (53) are attached to the units (52) when the reflector (53) is tensioned or to the reflector fixing mesh (55) disposed under the reflector (53).

12. The deployable reflector of claim 11, further comprising additional gaskets (83) configured to change a length between lower portions of the spatial shape gasket (51) and upper portions of the spatial shape gasket (51) and change a length of the spatial shape gasket (51) by changing a number of the additional gaskets (83).

13. The deployable reflector of claim 12, further comprising screw sockets (85) arranged in the lower portions of the spatial shape gasket (51) and upper portions of the spatial shape gasket (51) in order to change the length between the lower portions of the spatial shape gasket (51) and upper portions of the spatial shape gasket (51), wherein an axis (87) having different direction thread is disposed between the screw sockets (85).

14. The deployable reflector of claim 1, further comprising a telescopic limiter (100) attached for regulating a distance between the spatially oriented units (11) of the upper booms (28) and the lower booms (29) by a threaded adjusting rod (103) disposed on an inner tube (102), the telescopic limiter (100) being capable of regulating a length of the telescopic limiter (100) and of being fixed in a designed state after finishing a deployment of an antenna associated with the deployable reflector.

15. The deployable reflector of claim 1, wherein the tube (70) is configured to serve as a connecting means disposed between intermediate units (20) of foldable rods and the central unit (6) of the section (3) of the deploying ring (2) and fastened by a fastening means (68) disposed on the rotary axis 64 of the central unit (6) of the section (3) of the deploying ring (2), wherein other ends of the tube (70) at both sides reach intermediate units (19) connecting the foldable rods of the upper booms (28) and the lower booms (29) of the tensioning frame (1).

16. The deployable reflector of claim 15, further comprising caps (71) having a locking means (72) and fastened on ends of the tube 70 for limiting sliding by influence of the load-bearing cable (27) led on the roller disposed at end of the plates (22) that connect the lower rods (14) and the upper rods (15), the lower rods (14) and the upper rods (15) being associated with a bearer disposed on a shaft of a cylindrical joint connecting the lower rods (14) and the upper rods (15) when the upper booms (28) and the lower booms (29) are fully opened.

17. The deployable reflector of claim 16, further comprising gear type synchronizers (13) fixedly attached at ends of the lower rods (14) and the upper rods (15), wherein teeth (72-2) associated with gear type synchronizers (13) abut to one another in the spatially oriented units (11) connecting the lower rods (14) and the upper rods (15) and hingedly fastened in a sheet of units by rods, the gear type synchronizers (13) being associated with a foldable rods connecting console (76) directed towards central units of a crosswise intersection of the pantograph levers (5), wherein, at the end of the pantograph levers (5), rollers (77) for passing the load-bearing cable (27) are disposed.

18. The deployable reflector of claim 17, further comprising a unit (73) having a bearer (78), the bearer (78) being capable of sliding on the tube (70) rigidly fastened on a shaft of a central cylindrical unit by a medium point, the and bearer (78) having caps (81) from inside of the deploying ring (2) and at ends of the deploying ring (2) and a bearer retaining mechanism (82) to retain the bearer (78) in a fully opened state of the lower rods (14) and the upper rods (15).

19. The deployable reflector of claim 16, further comprising two pairs of rollers (104) fastened at both sides of other ends of the tube (70) fastened by units at a side of the upper booms (28) and the lower booms (29) on a fastening means (68) disposed on the rotary axis 64 of the central unit (6) of the section (3) of the deploying ring (2) when and the deploying load-bearing cable (27) is led on the two pairs of rollers (104), wherein other ends of the tube (70) at both sides of the tube (70) reach an axis of a roller (105) disposed above a cylindrical unit that connect the lower rods (14) and the upper rods (15) of the tensioning frame (1).

20. The deployable reflector of claim 19, wherein the caps (71) are fastened at ends of the tube (70) to retain a bearer (71-1), the bearer (71-1) being disposed on a shaft of a cylindrical joint connecting the lower rods (14) and the upper rods (15) when the upper booms (28) and the lower booms (29) are fully opened; and wherein the bearer (71-1) is capable of moving by influence of the load-bearing cable (27) led on the roller (104) disposed at an end of the tube (7), passing the roller disposed on the cylindrical joint connecting the lower rods (14) and the upper rods (15), than returning to the roller (105) disposed on the cylindrical joint and led on a neighboring section.

* * * * *